United States Patent
Murawaka

(10) Patent No.: US 9,041,348 B2
(45) Date of Patent: May 26, 2015

(54) ELECTRIC POWER SUPPLY SYSTEM AND ELECTRIC POWER SUPPLY METHOD

(75) Inventor: Katsutoshi Murawaka, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 697 days.

(21) Appl. No.: 13/393,077

(22) PCT Filed: Aug. 30, 2010

(86) PCT No.: PCT/IB2010/002124
§ 371 (c)(1),
(2), (4) Date: Feb. 28, 2012

(87) PCT Pub. No.: WO2011/024067
PCT Pub. Date: Mar. 3, 2011

(65) Prior Publication Data
US 2012/0187900 A1 Jul. 26, 2012

(30) Foreign Application Priority Data
Aug. 31, 2009 (JP) .................................. 2009-199890

(51) Int. Cl.
*H02J 7/00* (2006.01)
*B60L 11/18* (2006.01)
*H02J 3/38* (2006.01)

(52) U.S. Cl.
CPC ......... *B60L 11/1824* (2013.01); *B60L 11/1816* (2013.01); *B60L 11/1861* (2013.01); *H02J 3/38* (2013.01); *Y02T 10/7005* (2013.01);
(Continued)

(58) Field of Classification Search
CPC ........ Y02T 90/12; Y02T 90/14; Y02T 90/128
USPC .................................. 320/104, 106, 107, 109
See application file for complete search history.

(56) References Cited

U.S. PATENT DOCUMENTS 5,594,318 A * 1/1997 Nor et al. ...................... 320/108
6,104,160 A 8/2000 Iwata et al.
(Continued)

FOREIGN PATENT DOCUMENTS

| EP | 1487079 A2 | 12/2004 |
| EP | 2219278 A1 | 8/2010 |

(Continued)

OTHER PUBLICATIONS

Japanese Office Action drafted Jul. 4, 2011 in corresponding JP2009-199890 and partial English language translation.
(Continued)

*Primary Examiner* — Edward Tso
*Assistant Examiner* — Aaron Piggush
(74) *Attorney, Agent, or Firm* — Gifford, Krass, Sprinkle, Anderson & Citkowski, P.C.

(57) ABSTRACT

An electric power supply system includes a connecting device that connects a secondary battery provided in a vehicle to a building, and a control apparatus that i) identifies the type of the vehicle that is connected to the connecting device, the type of the secondary battery, or the type of electric power that is distinguishable by the charging source of the electric power stored in the secondary battery, ii) determines a preset electric power supply method based on the identification results, and iii) controls a supply of electric power from the secondary battery to the building based on the determined electric power supply method.

13 Claims, 13 Drawing Sheets

(52) U.S. Cl.
CPC ............ *Y02T10/7044* (2013.01); *Y02T 10/705* (2013.01); *Y02T 10/7088* (2013.01); *Y02T 90/14* (2013.01); *Y02T 90/121* (2013.01); *Y04S 10/126* (2013.01); *Y02E 60/721* (2013.01)

(56) References Cited

U.S. PATENT DOCUMENTS

| | | | |
|---|---|---|---|
| 7,847,518 | B2 | 12/2010 | Ichikawa et al. |
| 8,058,836 | B2 | 11/2011 | Ichikawa et al. |
| 2010/0090524 | A1 | 4/2010 | Obayashi |
| 2010/0217485 | A1 | 8/2010 | Ichishi |

FOREIGN PATENT DOCUMENTS

| | | |
|---|---|---|
| JP | 11178234 A | 7/1999 |
| JP | 2001-008380 A | 1/2001 |
| JP | 2001-258177 A | 9/2001 |
| JP | 2002-315193 A | 10/2002 |
| JP | 2007-236023 A | 9/2007 |
| JP | 3985390 B | 10/2007 |
| JP | 2008-035665 A | 2/2008 |
| JP | 2008-043040 A | 2/2008 |
| JP | 2008100645 A | 5/2008 |
| JP | 4164996 B | 10/2008 |
| JP | 2008-289273 A | 11/2008 |
| WO | WO-2009014543 A1 | 1/2009 |
| WO | WO-2009069481 A1 | 6/2009 |

OTHER PUBLICATIONS

International Search Report dated Sep. 20, 2011 from PCT/IB2010/002124.

Written Opinion dated Sep. 20, 2011 from PCT/IB2010/002124.

* cited by examiner

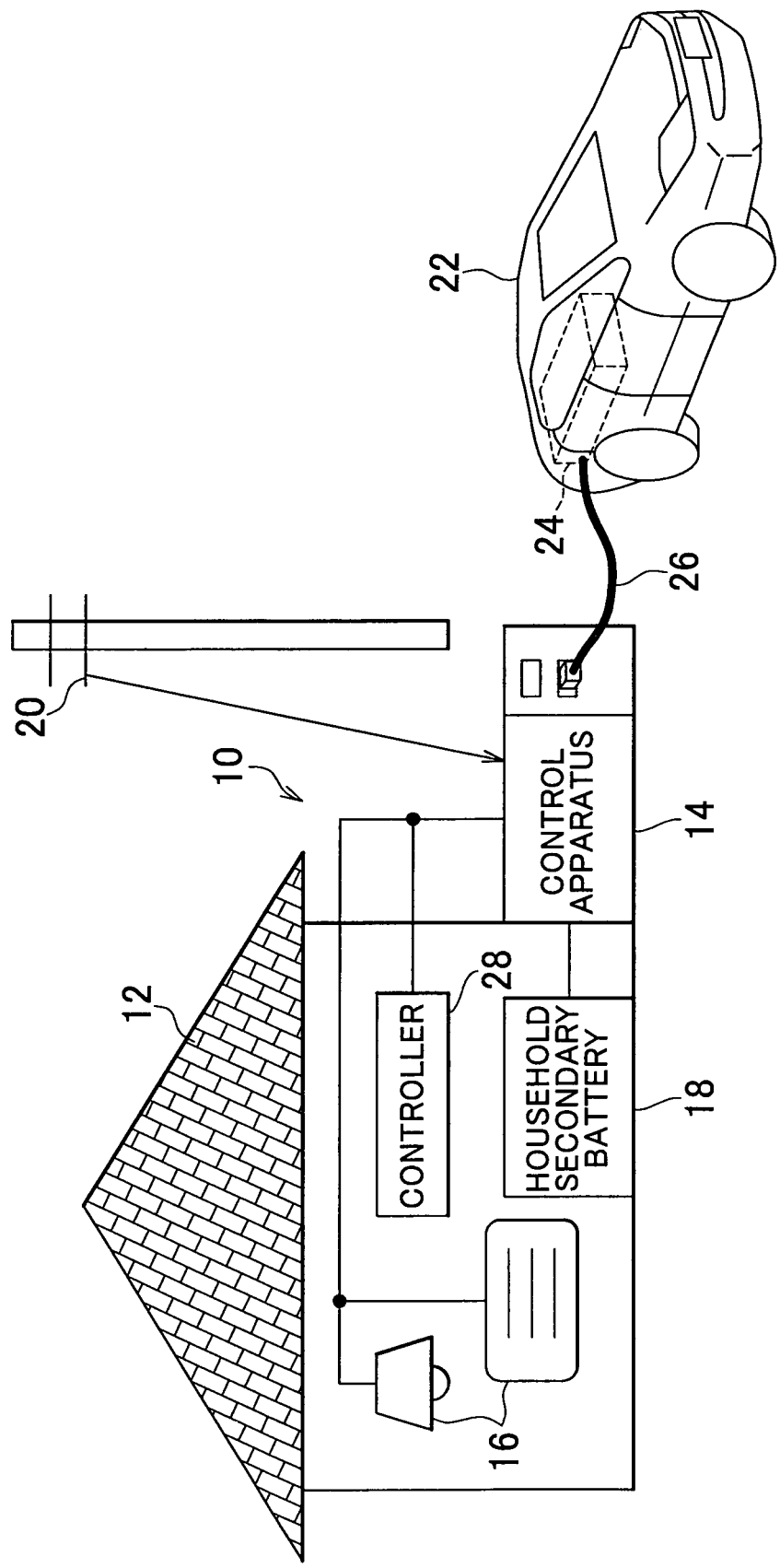

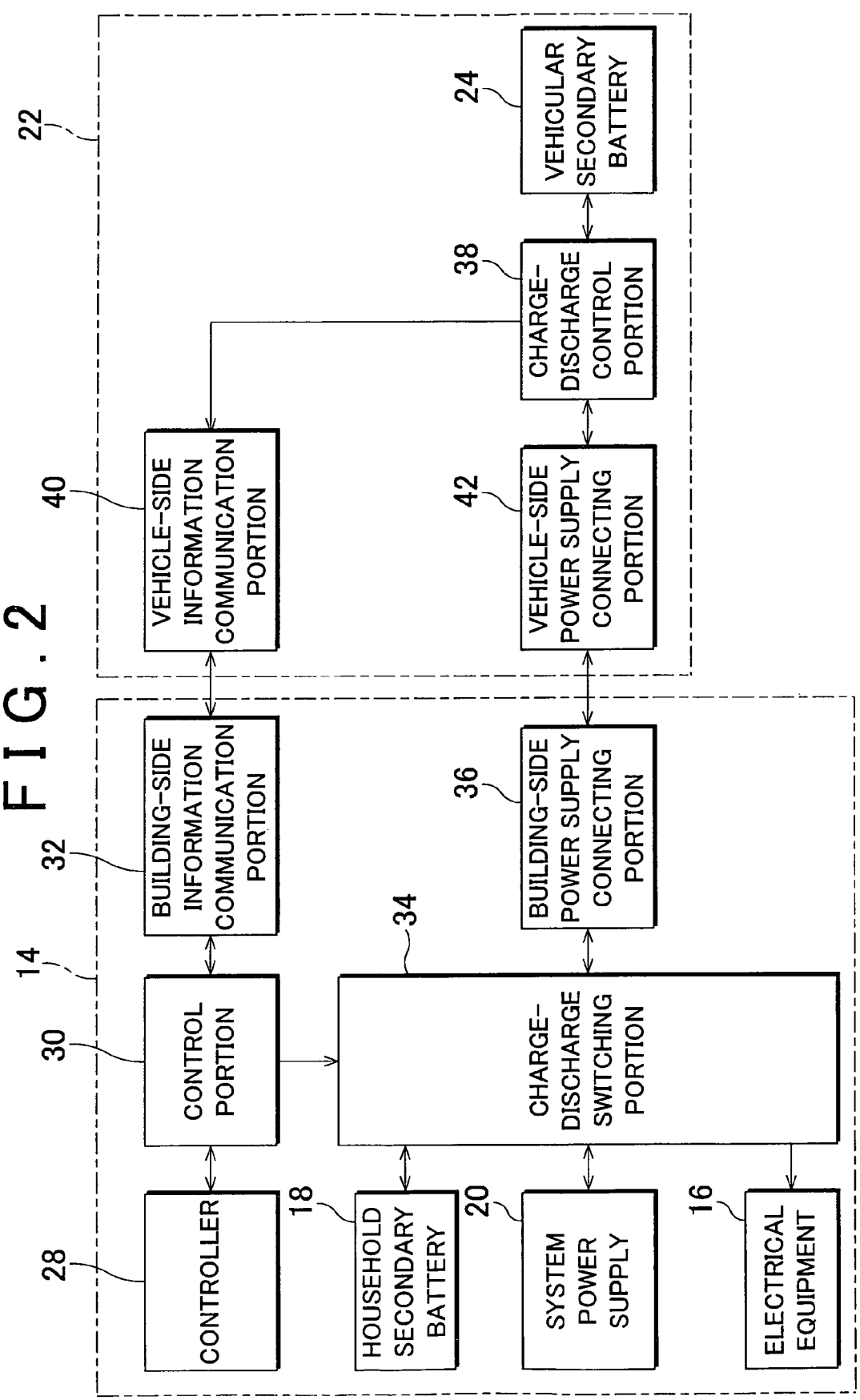

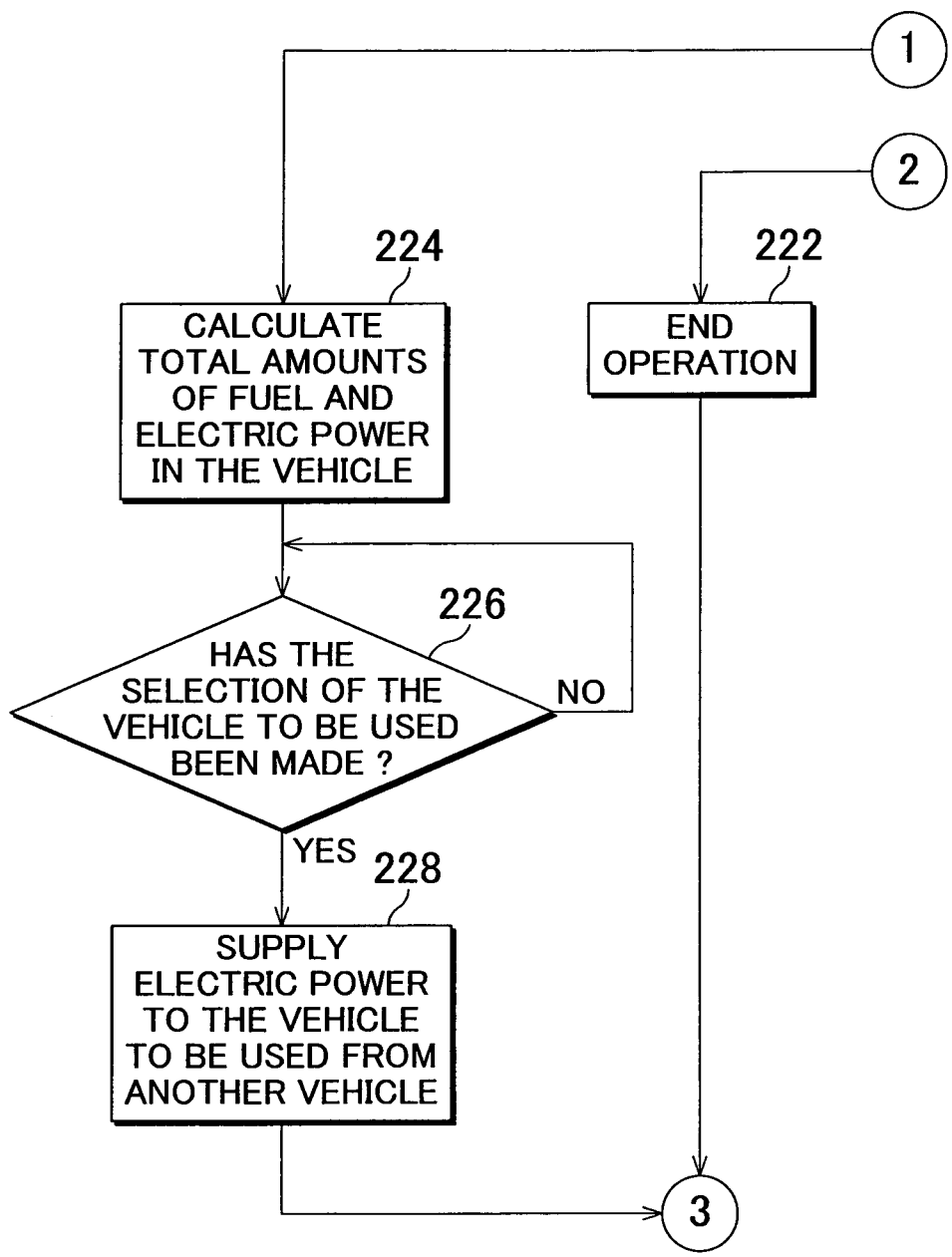

ELECTRIC POWER SUPPLY SYSTEM AND ELECTRIC POWER SUPPLY METHOD

CROSS-REFERENCE TO RELATED APPLICATIONS

This application is the U.S. National Phase of PCT/IB2010/002124 filed Aug. 30, 2010, which claims priority of Japanese Patent Application 2009-199890 filed Aug. 31, 2009.

BACKGROUND OF THE INVENTION

1. Field of the Invention

The invention relates to an electric power supply system, and more particularly, an electric power supply system and an electric power supply method that supplies electric power from a secondary battery provided in a vehicle to a building.

2. Description of the Related Art

In recent years, with the aim of reducing $CO_2$ in an attempt to prevent global warming, hybrid vehicles that are provided with a secondary battery and use both an engine and a motor as a power source, have become increasingly popular, and electric vehicles that are provided with a secondary battery are also starting to receive attention.

Moreover, technology for supplying electric power from a secondary battery provided in such a vehicle to a house has been proposed (Japanese Patent Application Publication No. 2008-100645 (JP-A-2008-100645), for example).

More specifically, JP-A-2008-100645 proposes technology to obtain an allocated amount of electric power required for normal use from the amount of electric power that is consumed daily by an electric vehicle, and supply electric power from the battery to a house in an amount that does not exceed the difference between the amount of electric power remaining in the battery and the allocated amount of electric power.

However, the amount of electric power that is able to be supplied from the vehicle to the house is different with an electric vehicle than it is with a hybrid vehicle. That is, a hybrid vehicle is able to run using gasoline, so all of the electric power can be supplied to the house. However, with the technology described in JP-A-2008-100645, no consideration is given to the type of battery, such as the battery of an electric vehicle or the battery of a hybrid vehicle, so there remains room for improvement in terms of supplying an appropriate amount of electric power to a house.

Also, with the technology described in JP-A-2008-100645, no consideration is given to the type of electric power that is charged to the vehicle, such as electric power that has been charged during hours when the electricity rates are low, such as nighttime power, and electric power that has been charged during normal hours, so there remains room for improvement in this area as well.

SUMMARY OF THE INVENTION

Therefore; the invention provides an electric power supply system and an electric power supply method that supplies appropriate electric power from a vehicle to a building.

A first aspect of the invention relates to an electric power supply system. This electric power supply system includes a connecting device that connects a secondary battery provided in a vehicle to a building, and a control apparatus that i) identifies the type of the vehicle that is connected to the connecting device, the type of the secondary battery, or the type of electric power that is distinguishable by the charging source of the electric power stored in the secondary battery, ii) determines a preset electric power supply method based on the identification results, and iii) controls a supply of electric power from the secondary battery to the building based on the determined electric power supply method.

According to this aspect, the secondary battery provided in the vehicle is connected to the building by the connecting device. As a result, electric power is able to be supplied from the electric power to the building.

Also, in the control apparatus, the type of the vehicle that is connected to the connecting device (such as a hybrid vehicle, an electric vehicle, or another type of vehicle), the type of the secondary battery (such as a secondary battery for charging electric power from a charging outlet or a secondary battery for charging electric power from regenerated electric power), or the type of electric power that is distinguishable by the charging source of the electric power stored in the secondary battery (such as electric power charged from a charging outlet or electric power charged from regenerated electric power) is identified, a preset electric power supply method is determined based on the identification results, and a supply of electric power from the secondary battery to the building is controlled based on the determined electric power supply method.

That is, electric power can be supplied to the building by a preset electric power supply method that is appropriate for the type of vehicle, the type of secondary battery, or the type of electric power or the like.

In the aspect described above, the control apparatus may control the supply of electric power such that all of the electric power in the secondary battery is supplied to the building when the type of the vehicle is identified as a hybrid vehicle. That is, when the vehicle is a hybrid vehicle, the vehicle is able to run on fuel and is thus able to run even if all of the electric power is supplied to the building. As a result, electric power for the building can be ensured by supplying all of the electric power in the secondary battery to the building.

In the aspect described above, the control apparatus may control the supply of electric power such that a portion of all of the electric power charged to the secondary battery is supplied to the building when the type of the vehicle is identified as a hybrid vehicle and the amount of fuel remaining in the vehicle is less than a predetermined amount. That is, if all of the electric power in the secondary battery is supplied to the building, the vehicle may not be able to run. Therefore, by supplying only a portion of the electric power in the secondary battery to the building and leaving the rest, it is possible to both supply electric power to the building and run the vehicle.

In the structure described above, the control apparatus may i) obtain information indicative of the type of the vehicle, the amount of fuel remaining in the vehicle, and a charging amount of the secondary battery, ii) determine the amount of electric power to supply based on the obtained information, and iii) control the supply of electric power such that the determined amount of electric power to supply is supplied to the building. As a result, it is possible to both supply electric power to the building and run the vehicle.

Also, in the structure described above, the control apparatus may identify the type of the secondary battery or the type of the electric power stored in the secondary battery by obtaining information indicative of the type of the secondary battery or the type of electric power stored in the secondary battery from the vehicle connected to the connecting device. That is, it is possible to identify the type of secondary battery provided or the type of electric power stored in the secondary battery or the like by communicating with the vehicle.

In the structure described above, the control apparatus may determine the order of priority in which i) electric power charged from a household power supply of the building, of the charging electric power in the secondary battery, and ii) electric power charged from regenerated electric power that is regenerated while the vehicle is running, are to be supplied to the building, and control the supply of electric power according to that determined order of priority. That is, it is possible to supply the appropriate electric power to the building by supplying electric power according to the order of priority.

Also, in the structure described above, the control apparatus may control the supply of electric power such that electric power that remains after electric power required for running the vehicle is subtracted from the electric power charged from the regenerated electric power, is preferentially supplied. That is, electric power other than the electric power required for running the vehicle is supplied to the building, so it is possible to both supply electric power to the building and run the vehicle.

Also, in the structure described above, the control apparatus may control the supply of electric power such that refresh discharging electric power of the secondary battery is supplied as a first priority. That is, refresh discharging is performed to prevent the secondary battery from degrading, and the electric power that is discharged during refresh discharging ends up being wasted. Preferentially supplying this refresh discharging electric power to the building, however, enables electric power to be used efficiently.

Incidentally, the structure described above may also include an input device that is provided in the building for inputting information relating to the vehicle, and the control apparatus may control the supply of electric power based on the information input into the input device. For example, when the type of vehicle is input via the input device, control may be performed to supply the remaining electric power in the secondary battery to the building if the vehicle is a hybrid vehicle, and supply only a portion of the electric power in the secondary battery to the building if the vehicle is an electric vehicle, or the electric power required for the next day may be input and control may be performed to supply electric power other than that electric power to the building, or the running distance that will be travelled the next day may be input and the electric power required for the next day may be calculated from that running distance, and control may be performed to supply electric power other than the calculated electric power to the building.

Moreover, in the structure described above, after the vehicle has finished being used each day, the control apparatus may control the supply of electric power such that electric power remaining in the secondary battery is supplied to the building during daytime electric utility hours or intermediate electric utility hours. That is, the electricity charges for the building can be reduced by supplying that electric power to the building during daytime electric utility hours or intermediate electric utility hours (on a plan with three different rates depending on the time of day).

Also, in the structure described above, the control apparatus may control the supply of electric power such that the electric power required for running the vehicle is also supplied when there is a power outage in the building. In this case, when the electric power required for running the vehicle has been consumed, the control apparatus may start an engine of the vehicle to generate electric power, and control the supply of electric power such that the generated electric power is supplied.

A second aspect of the invention relates to an electric power supply method of an electric power supply system provided with a connecting device that connects a secondary battery provided in a vehicle to a building. This electric power supply method includes identifying the type of the vehicle that is connected to the connecting device, the type of the secondary battery, or the type of electric power that is distinguishable by the charging source of the electric power stored in the secondary battery; determining a preset electric power supply method based on the identification results; and controlling a supply of electric power from the secondary battery to the building based on the determined electric power supply method.

Accordingly, the invention as described above is able to supply the appropriate electric power from a vehicle to a building by determining the electric power supply method according to the type of vehicle, the type of secondary battery, or the type of electric power or the like, and supplying electric power from the secondary battery of the vehicle to the building according to the determined electric power supply method.

BRIEF DESCRIPTION OF THE DRAWINGS

The foregoing and features and advantages of the invention will become apparent from the following description of example embodiments with reference to the accompanying drawings, wherein like numerals are used to represent like elements and wherein:

FIG. 1 is a schematic diagram of an electric power supply system according to a first example embodiment of the invention;

FIG. 2 is a block diagram of the structure of a control system of a control apparatus of the electric power supply system according to the first example embodiment of the invention, and a control system of a vehicle connected to that control apparatus;

FIG. 6A and FIG. 6B are a flowchart illustrating an example of a routine for supplying electric power from a vehicle to a building, in a routine executed by the control apparatus of the electric power supply system according to the first example embodiment of the invention;

DETAILED DESCRIPTION OF EMBODIMENTS

Figure 3A:
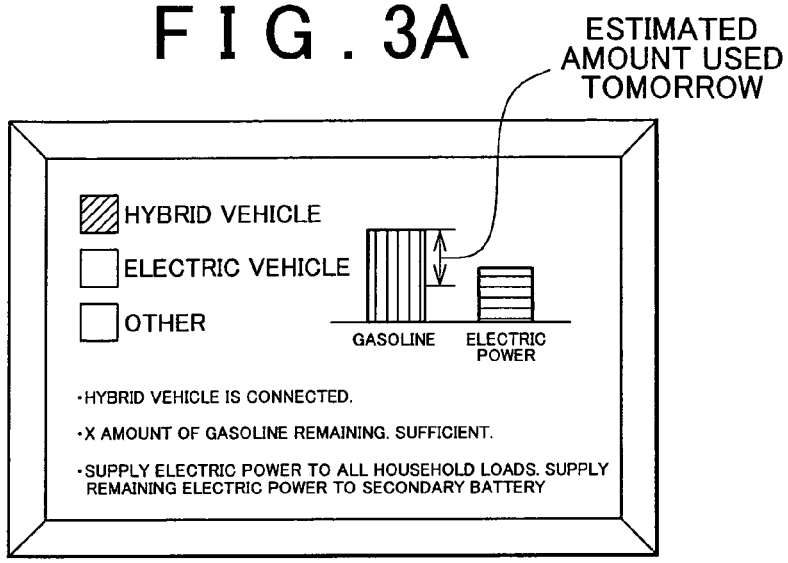
FIG. 3A is a view of an example of a display screen of a controller when a hybrid vehicle is connected.

Example embodiments of the present invention will be described in greater detail below with reference to the accompanying drawings. FIG. 1 is a schematic diagram of an electric power supply system according to a first example embodiment of the invention.

The electric power supply system 10 according to this first example embodiment of the invention includes a control apparatus 14 that controls the supply of electric power used by a building 12 such as a house. Incidentally, in this example embodiment the building 12 is an individual house, but the invention is not limited to this. For example, the invention may also be applied to an apartment house or another type of building.

This control apparatus 14 is connected to electrical equipment (such as lighting equipment, an air-conditioner, and the like) 16 provided in the building 12, a household secondary battery 18 that stores electric power used by the building 12, and a system power supply 20, as well as to a vehicular secondary battery 24 provided in a vehicle 22 such as an electrical vehicle or a hybrid vehicle that uses both an engine and a motor as a power source. Incidentally, the control apparatus 14 and the vehicular secondary battery 24 are connected (i.e., plugged in) by a cable 26 for establishing an electrical connection, but the invention is not limited to this.

The control apparatus 14 functions to convert direct current (DC) electric power into alternating current (AC) electric power, and performs electric power supply control. For example, the control apparatus 14 converts the electric power supplied from the system power supply 20 into DC electric power and charges the household secondary battery 18 and the vehicular secondary battery 24 by supplying the converted electric power thereto, converts the electric power stored in the household secondary battery 18 and the vehicular secondary battery 24 into AC electric power and supplies that converted electric power to the electrical equipment (such as the such as lighting equipment, an air-conditioner, and the like) 16, and supplies electric power that is supplied from the system power supply 20 to the electrical equipment 16 provided in the building 12 via a switchboard and the like.

The control apparatus 14 is also connected to a controller 28. This controller 28 is used to perform various settings when supplying electric power from the building 12 to the vehicle 22, as well as when supplying electric power from the vehicle 22 to the building 12, and the like. Moreover, the controller 28 includes a monitor that displays a screen used to perform the various settings, and operation keys used to perform the various setting operations, and the like.

Continuing on, the structures of the control systems of the control apparatus 14 and the vehicle 22 will be described. FIG. 2 is a block diagram of the structure of the control system of the control apparatus 14 of the electric power supply system 10 according to the first example embodiment of the invention, and the control system of the vehicle 22 connected to that control apparatus 14.

The control apparatus 14 includes a control portion 30, and this control portion 30 controls the supply of electric power to the house.

The control portion 30 is connected to the controller 28 as well as to a building-side information communication portion 32. Various information that has been entered via the controller 28 is input to the control portion 30, and information from the vehicle 22 side is obtained by the building-side information communication portion 32. For example, information such as the type of vehicle that is connected (e.g., whether the vehicle is a hybrid vehicle, an electric vehicle, or another kind of vehicle): when electric power is being supplied from the vehicle 22 to the building 12, as well as the running distance and electric power required by the vehicle 22 for the next day, and the like, are input using the controller 28.

Also, the control portion 30 is connected to a charge-discharge switching portion 34 that switches the flow of electric power. This charge-discharge switching portion 34 is controlled by the control of the control portion 30.

The charge-discharge switching portion 34 is connected to a building-side power supply connecting portion 36 for connecting to the household secondary battery 18, the system power supply 20, the electrical equipment 16, and the vehicular secondary battery 24. This charge-discharge switching portion 34 switches the power supply (i.e., the electric power obtained from the household secondary battery 18, the system power supply 20, and the building-side power supply connecting portion 36) that supplies electric power to the electrical equipment 16 and the like that are the loads in the building 12.

Meanwhile, the vehicle 22 includes a charge-discharge control portion 38. The charging and discharging of the vehicular secondary battery 24 are controlled by this charge-discharge control portion 38.

The charge-discharge control portion 38 is connected to a vehicle side information communication portion 40, a vehicle-side power supply connecting portion 42, and the vehicular secondary battery 24. The charge-discharge control portion 38 stores information such as vehicle ID information and information pertaining to the type of vehicle (e.g., whether the vehicle is a hybrid vehicle, an electric vehicle, or a gasoline-powered vehicle or the like). This information is output to the control portion 30 via the vehicle-side information communication portion 40 and the building-side information communication portion 32.

The vehicle-side power supply connecting portion 42 is connected via the cable 26 to the building-side power supply connecting portion 36. The vehicular secondary battery 24 is charged using electric power supplied from the building 12 or electric power charged to the vehicular secondary battery 24 is supplied to the building 12, according to control of the charge-discharge control portion 38.

Incidentally, the building-side information communication portion 32 may be connected to the vehicle-side information communication portion 40 by the cable 26 and another wire, or an information-carrying wire may be provided in the cable 26 and the building-side information communication portion 32 may be connected to the vehicle-side information communication portion 40 by this wire. Alternatively, the building-side information communication portion 32 may be connected to the vehicle-side information communication portion 40 by the cable 26 and both electric power and the information may be passed along by this single cable, or the building-side information communication portion 32 may be connected to the vehicle-side information communication portion 40 by wireless communication.

Next, an example of supplying electric power by the electric power supply system 10 according to the first example embodiment of the invention structured as described above will be described.

First, a case in which electric power is supplied from the vehicular secondary battery 24 to the building 12 will be described. The switch such that power is supplied from the vehicular secondary battery 24 to the building 12 is performed by operating the controller 28.

In this example embodiment, when the controller 28 performs an operation to supply electric power from the vehicular secondary battery 24 to the building 12, the control portion 30 determines whether the type of vehicle that is connected is a hybrid vehicle, an electric vehicle, or another type of vehicle. This determination may be made by having the control portion 30 of the building 12 communicate with the charge-discharge control portion 38 of the vehicle 22 by connecting the building-side information communication portion 32 to the vehicle-side information communication portion 40, and obtain information relating to the vehicle 22 from the charge-discharge control portion 38. Alternatively, the user may input the type of vehicle 22 into the controller 28 in advance, and the determination may be made based on that input information.

When the vehicle that is connected is a hybrid vehicle, the vehicle is able to run on gasoline so the control portion 30 determines whether the amount of gasoline remaining is enough for the vehicle 22 to travel the next running distance. This determination is made by obtaining the amount of fuel remaining in the vehicle 22 by having the control portion 30 communicate with the charge-discharge control portion 38 via the building-side information communication portion 32 and the vehicle-side information communication portion 40, and calculating the fuel necessary for the vehicle to travel the running distance or arrive at a destination input using the controller 28. Incidentally, the daily driving routine may be stored and the next destination or running distance may be obtained through learning. Also, if it is determined that there is enough fuel remaining for the vehicle to travel the next running distance, all of the electric power stored in the vehicular secondary battery 24 is supplied to the building 12. At this time, the controller 28 indicates that the hybrid vehicle is connected, displays the estimated amount of gasoline used and the amount of electric power remaining (i.e., the state-of-charge), and indicates that all of the electric power will be supplied to the building 12, as shown in FIG. 3A.

Figure 3B:
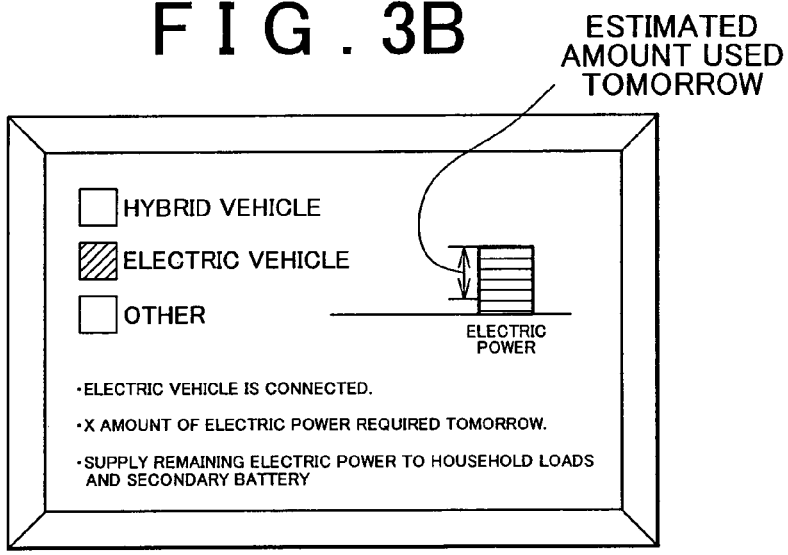
FIG. 3B is a view of an example of a display screen of the controller when an electric vehicle is connected.

Also, when the vehicle 22 that is connected is an electric vehicle, the control portion 30 determines whether the electric power stored in the vehicular secondary battery 24 is enough for the vehicle to travel the next running distance. This determination is made by having the control portion 30 obtain the amount of electric power stored in, the vehicular secondary battery 24 by communicating with the charge-discharge control portion 38 via the building-side information communication portion 32 and the vehicle-side information communication portion 40, and calculate the amount of electric power required to drive to the destination (or travel the running distance) input with the controller 28. Incidentally, the daily driving routine may be stored and the next destination may be obtained through learning. Also, if it is determined that there is enough electric power remaining for the vehicle 22 to travel the next running distance, all of the electric power except for the amount required for the vehicle 22 to travel the next running distance is supplied to the building 12. At this time, the controller 28 indicates that the electric vehicle is connected, displays the estimated amount of electric power that will be used the next day, and indicates that the remaining electric power, i.e., the electric power aside from the estimated amount of electric power that will be used the next day, will be supplied to the building 12, as shown in FIG. 3B.

Figure 3C:
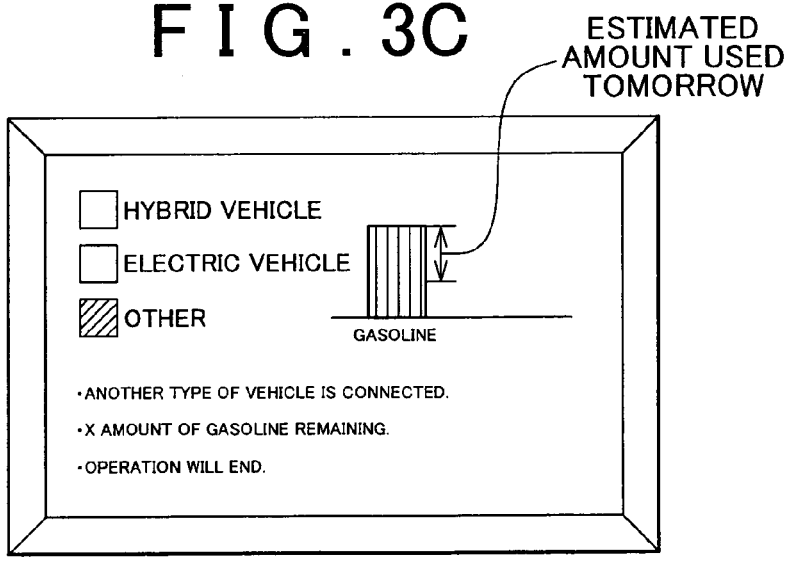
FIG. 3C is an example of a display screen of the controller when another vehicle is connected.

Further, when the vehicle 22 that is connected is a type of vehicle other than a hybrid vehicle or an electric vehicle, such as a gasoline-operated vehicle, electric power is normally unable to be supplied or received so the electric power supply operation ends. At this time, the controller 28 indicates that this other type of vehicle is connected, displays the estimated amount of gasoline that will be used the next day, and indicates that the operation will end, as shown in FIG. 3C.

Next, a case in which electric power is supplied from the building 12 to the vehicular secondary battery 24 will be described. The switch to supply electric power such that electric power is supplied from the building 12 to the vehicular secondary battery 24 is performed by operating the controller 28.

In this example embodiment, when the controller 28 performs an operation to supply electric power from the building 12 to the vehicular secondary battery 24, the control portion 30 determines whether the type of vehicle that is connected is a hybrid vehicle, an electric vehicle, or another type of vehicle. This determination may be made by having the control portion 30 of the building 12 communicate with the charge-discharge control portion 38 of the vehicle 22 by connecting building-side information communication portion 32 to the vehicle-side information communication portion 40, and obtain information relating to the vehicle 22 from the charge-discharge control portion 38. Alternatively, the user may input the type of vehicle 22 into the controller 28 in advance, and the determination may be made based on that input information.

When the vehicle that is connected is a hybrid vehicle, the vehicle is able to run on gasoline. Therefore, the amount of gasoline remaining and the amount of electric power remaining (i.e., the state-of-charge) are displayed on the controller 28, and the control portion 30 determines whether the vehicular secondary battery 24 of the vehicle 22 is able to be charged, as well as the charging amount of the vehicular secondary battery 24. If the vehicular secondary battery 24 of the vehicle 22 is able to be charged, electric power is supplied from the building 12 to the vehicle 22 and the vehicular secondary battery 24 is charged. Incidentally, whether the vehicular secondary battery 24 is able to be charged as well as the charging amount of the vehicular secondary battery 24 may be entered (i.e., input) by the user operating the controller 28, or the charging amount and the like may be calculated by estimating the running pattern or running distance by obtaining the running history of the vehicle 22 from the charge-discharge control portion 38.

Also, when the vehicle 22 that is connected is an electric vehicle, the vehicle 22 is unable to run on gasoline. Therefore, if the control portion 30 determines that the vehicle 22 is an electric vehicle, electric power is supplied from the building 12 and the vehicular secondary battery 24 starts to be charged. Incidentally, the vehicular secondary battery 24 may also be charged after calculating the charging amount by estimating the running pattern or running distance by obtaining the running history of the vehicle 22 from the charge-discharge control portion 38.

Also, when the vehicle 22 that is connected is a type of vehicle other than a hybrid vehicle or an electric vehicle, such as a gasoline-operated vehicle, charging is not necessary so the operation ends.

Furthermore, when a plurality of vehicles 22, such as a plurality of hybrid vehicles or electric vehicles or the like, are connected, the control apparatus 14 monitors the electrical load in the building 12 and obtains information pertaining to the vehicles 22 that has been input into the controller 28 beforehand. Then the vehicular secondary battery 24 of each vehicle 22 is charged by supplying electric power from the building 12 after first determining the order of charging priority based on the electrical load in the building 12 and the information of each vehicle 22, so that the breaker does not trip. Also, in this example embodiment, when a plurality of hybrid vehicles or electric vehicles are connected, the vehicle 22 that will be used is selected by operating the controller 28 and the vehicular secondary battery 24 of that vehicle 22 is charged using electric power supplied from the vehicular secondary battery 24 of the other vehicle 22.

Figure 4:
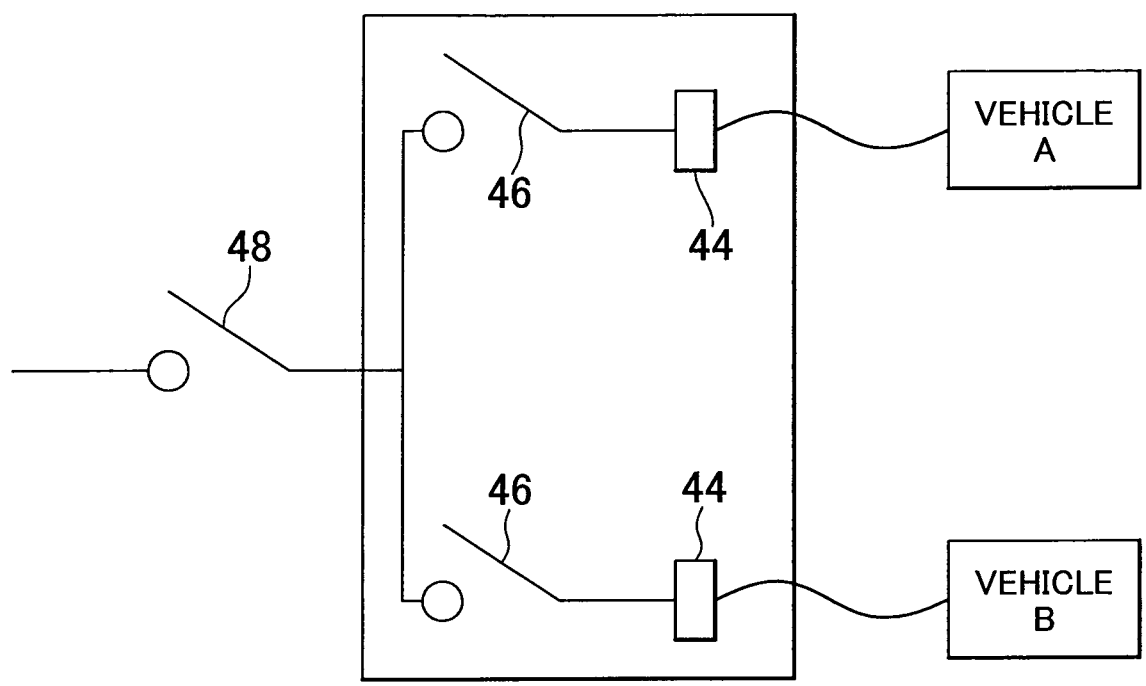
FIG. 4 is a diagram of a structure for supplying electric power from like vehicles.

Electric power is supplied from the other vehicle 22 to the vehicle 22 that is going to be used via, for example, outlets 44 that connect with a plurality of vehicles (two, i.e., vehicle A and vehicle B in FIG. 4), a switch 46 provided for each outlet, and a main switch 48 that connects the building 12 side to each vehicle 22, as shown in FIG. 4. Electric power can be supplied between the vehicles 22 by turning the main switch 48 off and turning the switches 46 between the vehicles 22 on. Supplying electric power directly between the vehicles 22 in this way reduces transmission loss. For example, if an electric vehicle is used one day and still has electric power left over, and a hybrid vehicle, which can also run on gasoline, will be used for a long trip the next day, electric power can be supplied from the electric vehicle to the hybrid vehicle. Or, if a two-seater hybrid vehicle is used one day and still has electric power left over, and five people plan to go somewhere together the next day, electric power can be supplied from the two-seater hybrid vehicle to a five-seater hybrid vehicle.

Figure 5A:
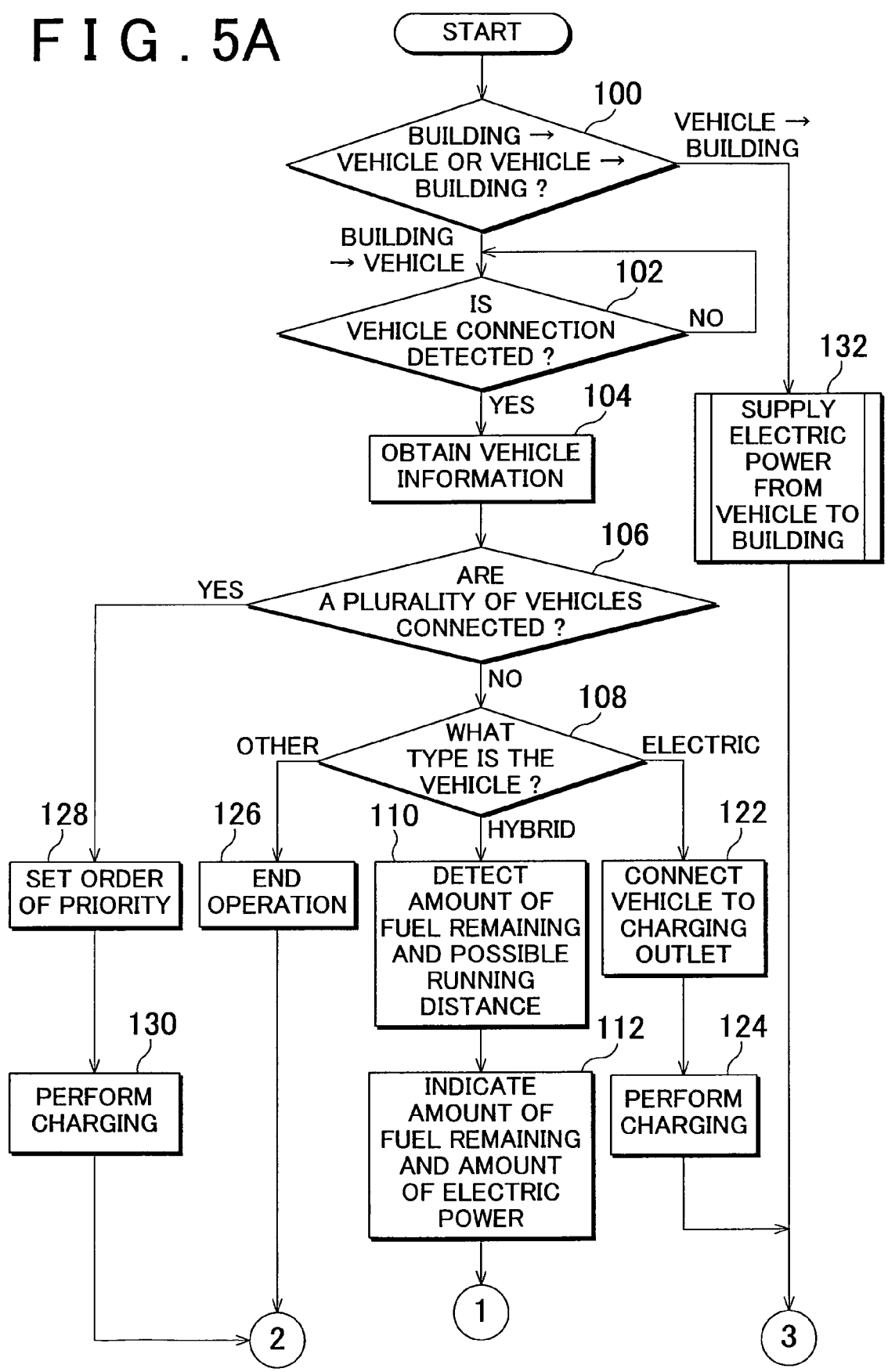
FIG. 5A and FIG. 5B are a flowchart illustrating an example of a routine executed by the control apparatus of the electric power supply system according to the first example embodiment of the invention.
Figure 5B:
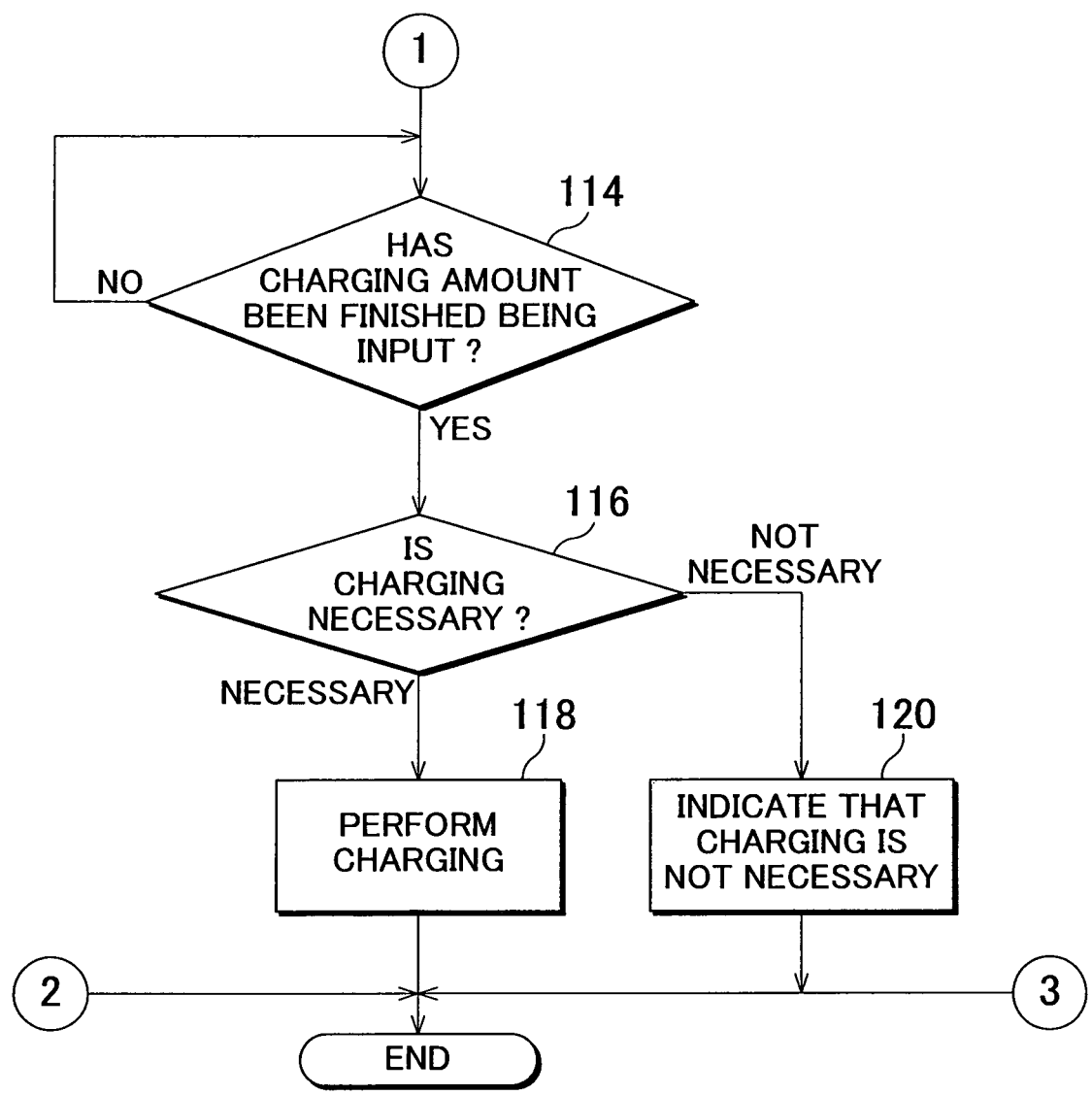

Continuing on, an example of a specific routine executed by the control apparatus 14 of the electric power supply system 10 according to the first example embodiment of the invention structured as described above will be described. FIG. 5A and FIG. 5B are a flowchart illustrating such a routine.

In step 100 the control portion 30 determines whether electric power will be supplied from the building 12 to the vehicle 22 or from the vehicle 22 to the building 12. This determines is made by the control portion 30 determining whether some sort of instruction has been given to the controller 28. If an instruction has been given to supply electric power from the building 12 to the vehicle 22, the process proceeds on to step 102. If, on the other hand, an instruction has been given to supply electric power from the vehicle 22 to the building 12, the process proceeds on to step 132.

In step 102, the control portion 30 determines whether a connection with vehicle 22 is detected. This determination is made by determining whether the cable 26 is plugged into an outlet by checking the connection state of the building-side power supply connecting portion 36 and the communication state of the building-side information communication portion 32 and the like. This step is repeated until the determination is yes, at which time the process proceeds on to step 104.

In Step 104, the control portion 30 obtains vehicle information. That is, the control portion 30 obtains vehicle information (such as the vehicle ID that includes the type of vehicle (i.e., whether the vehicle is a hybrid vehicle or an electric vehicle or the like), the amount of gasoline remaining, the amount of electric power remaining (i.e., the state-of-charge), and the like) by communicating with the charge-discharge control portion 38 via the building-side information communication portion 32 and the vehicle-side information communication portion 40. After step 104, the process proceeds on to step 106.

In step 106, the control portion 30 determines whether a plurality of vehicles 22 are connected. If the determination is no, the process proceeds on to step 108. If, on the other hand, the determination is yes, the process proceeds on to step 128.

In step 108, the type of vehicle is determined. If the vehicle is a hybrid vehicle, the process proceeds on to step 110. If the vehicle is an electric vehicle, the process proceeds on to step 122. If the vehicle is another type of vehicle, the process proceeds on to step 126.

In step 110, the amount of fuel remaining and the possible running distance are detected. The amount of fuel remaining and the possible running distance are detected by having the charge-discharge control portion 38 monitor and store information relating to the vehicle 22, and then having the control portion 30 obtain that stored information by communicating with the charge-discharge control portion 38. After step 110, the process proceeds on to step 112.

In step 112, the detected amount of fuel remaining and the amount of electric power are displayed on the controller 28, and then the process proceeds on to step 114.

In step 114, the control apparatus 30 determines whether the charging amount has finished being input. This determination is made by operating the controller 28 to determine whether the charging amount and the planned running distance and the like has been input. This step is repeated until this determination is yes, at which time the process proceeds on to step 116. Incidentally, if the controller 28 is operated and an instruction is given to carry out another process while this step is being repeated, that instructed process is carried out.

In step 116, the control portion 30 determines whether charging is necessary. When the planned running distance has been input into the controller 28, for example, this determination is made by the control portion 30 determining whether running is possible with the amount of gasoline remaining or the amount of electric power remaining. If this determination is no, the process proceeds on to step 118. If, on the other hand, the determination is yes, the process proceeds on to step 120.

In step 118, electric power is supplied from the building 12 to charge the vehicular secondary battery 24. The electric power supplied from the building 12 may be supplied from the household secondary battery 18 or the system power supply 20. If the electric power is supplied from the system power supply 20, charging may be performed late at night. Alternatively, the vehicular secondary battery 24 may be charged with electric power charged to the household secondary battery 18 late at night.

Also, in step 120, the controller 28 indicates that charging is not possible, after which this cycle of the process then ends.

On the other hand, if it is determined in step 108 that the vehicle 22 is an electric vehicle, the process proceeds on to step 122 as described above, where the vehicle 22 is connected to the charging outlet such that electric power can be supplied from the household secondary battery 18 or the system power supply 20 of the building 12 to the vehicular secondary battery 24. Then the process proceeds on to step 124, where electric power is supplied from the building 12 to charge the vehicular secondary battery 24. Just as described above, when electric power is supplied from the building 12 at this time, that electric power may be supplied from the household secondary battery 18 or from the system power supply 20. When the electric power is supplied from the system power supply 20, charging may be performed late at night. Alternatively, the vehicular secondary battery 24 may be charged with electric power charged to the household secondary battery 18 late at night.

Also, if it is determined in step 108 that the vehicle 22 is another type of vehicle, the process proceeds on to step 126 as described above, where the operation ends, after which this cycle of the process ends.

Further, if it is determined in step 106 that a plurality of vehicles are connected, the process proceeds on to step 128 as described above, where the control portion 30 sets the order of charging priority. The order of priority may be set, for example, based on the electrical load in the building 12 and the information of each vehicle 22 (i.e., information entered into the controller 28), so that the breaker does not trip. After step 128, the process proceeds on to step 130.

In step 130, the vehicular secondary battery 24 is charged according to the set order of priority, and then this cycle of the routine ends. Just as described above, the electric power supplied from the building 12 may be supplied from the household secondary battery 18 or the system power supply 20. If the electric power is supplied from the system power supply 20, charging may be performed late at night. Alternatively, the vehicular secondary battery 24 may be charged with electric power charged to the household secondary battery 18 late at night.

Figure 6A:
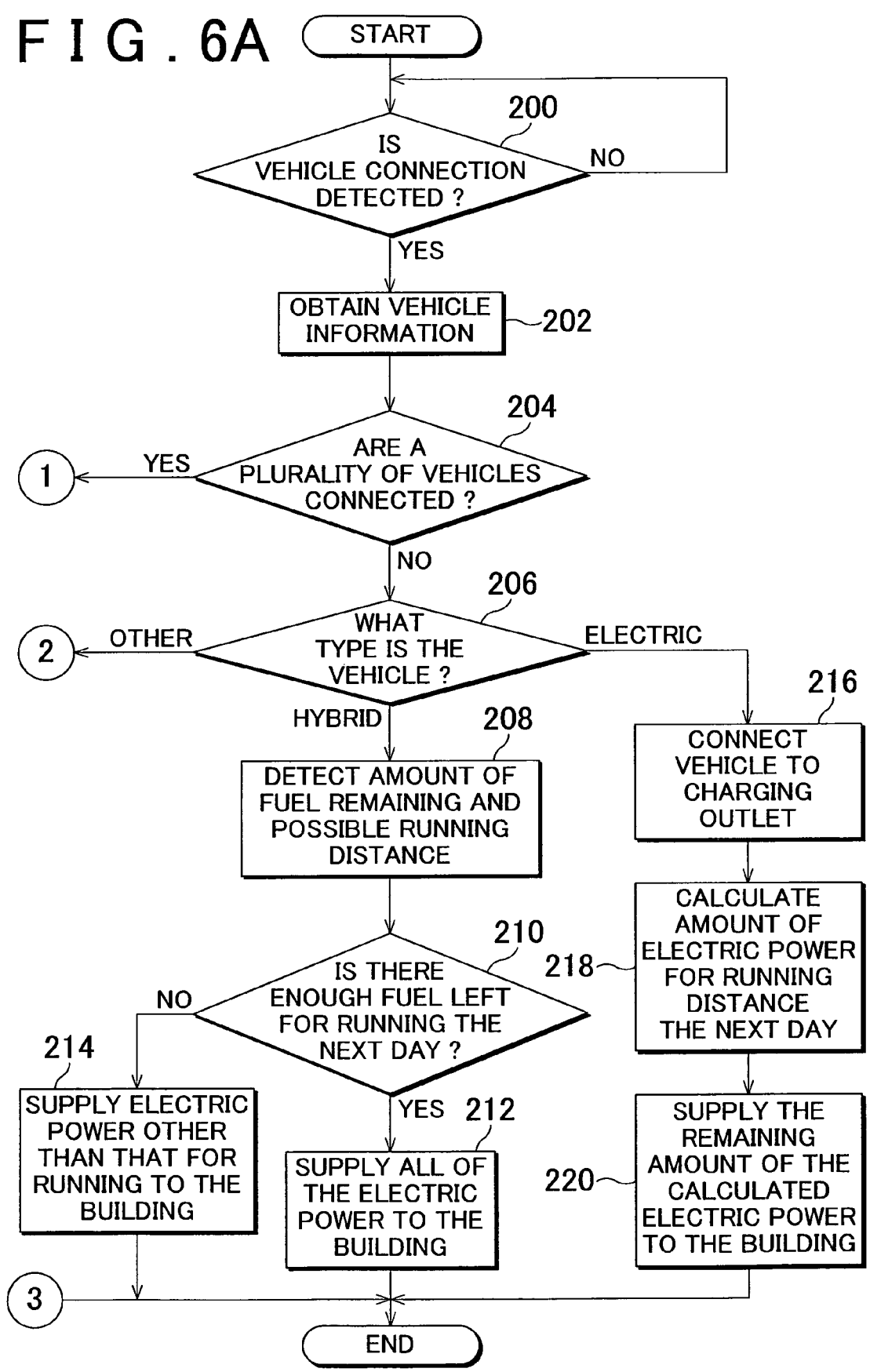

On the other hand, if it is determined in step 100 that electric power will be supplied from the vehicle 22 to the building 12, the process proceeds on to step 132 as described above, where power is supplied from the vehicle 22 to the building 12. Here, the routine for supplying power from the vehicle 22 to the building 12 will be described with reference to FIG. 6A and FIG. 6B, which is a flowchart illustrating an example of a routine for supplying electric power from the vehicle 22 to the building 12, in a routine executed by the control apparatus of the electric power supply system according to the first example embodiment of the invention.

First in step 200, the control portion 30 determines whether a connection with vehicle 22 is detected. This determination is made by determining whether the cable 26 is plugged into an outlet by checking the connection state of the building-side power supply connecting portion 36 and the communication state of the building-side information communication portion 32 and the like. This step is repeated until the determination is yes, at which time the process proceeds on to step 202.

In step 202, the control portion 30 obtains vehicle information. That is, the control portion 30 obtains vehicle information (such as the vehicle ID that includes the type of vehicle (i.e., whether the vehicle is a hybrid vehicle or an electric vehicle or the like), the amount of gasoline remaining, the amount of electric power remaining (i.e., the state-of-charge), and the like) by communicating with the charge-discharge control portion 38 via the building-side information communication portion 32 and the vehicle-side information communication portion 40. After step 202, the process proceeds on to step 204.

In step 204, the control portion 30 determines whether a plurality of vehicles 22 are connected. If the determination is no, the process proceeds on to step 206. If, on the other hand, the determination is yes, the process proceeds on to step 224.

In step 206, the type of vehicle is determined. If the vehicle 22 is a hybrid vehicle, the process proceeds on to step 208. If the vehicle 22 is an electric vehicle, the process proceeds on to step 216. If the vehicle 22 is another type of vehicle, the process proceeds on to step 222.

In step 208, the amount of fuel remaining and the possible running distance are detected. The amount of fuel remaining and the possible running distance are detected by having the charge-discharge control portion 38 monitor and store information relating to the vehicle 22, and then having the control portion 30 obtain that, stored information by communicating with the charge-discharge control portion 38. After step 208; the process proceeds on to step 210.

In step 210, it is determined whether there is enough fuel for running the next day. This determination is made, for example, by determining whether there is enough fuel for running by entering the running distance for the next day or the like into the controller 28, or by storing the daily running pattern, estimating the running distance or the like through learning, and determining whether there is enough fuel to travel that estimated running distance. If the determination is yes, the process proceeds on to step 212. If, on the other hand, the determination is no, the process proceeds on to step 214.

In step 212, all of the electric power in the vehicular secondary battery 24 is supplied to the building 12. That is, there is enough fuel remaining for running the next day so all of the electric power that has been supplied to the vehicular secondary battery 24 is supplied to the building 12. After step 212, this cycle of the routine ends.

Also, in step 214, electric power other than that required for running is supplied to the building 12. That is, all of the electric power except for the amount required for the vehicle 22 to travel the next running distance is supplied from the vehicular secondary battery 24 to the building 12. After step 214, this cycle of the routine ends.

On the other hand, if it is determined in step 206 that the vehicle 22 is an electric vehicle, the process proceeds on to step 216 as described above, where the vehicle 22 is connected to the charging outlet such that charging is possible. Then the process proceeds on to step 218 where the amount of electric power necessary to travel the running distance the next day is calculated. For example, the amount of electric power required is calculated by entering the running distance for the next day or the like into the controller 28. Alternatively, the daily running pattern is stored, the running distance or the like is estimated through learning, and the amount of electric power necessary to travel that estimated running distance is then calculated. After step 218, the process proceeds on to step 220.

In step 220, electric power other than that calculated amount of electric power is supplied to the building 12, after which this cycle of the routine ends.

Also, if it is determined in step 206 that the vehicle is another type of vehicle 22, the process proceeds on to step 222 as described above, where the operation ends, after which this cycle of the routine ends.

Also, if it is determined in step 204 that a plurality of vehicles 22 are connected, the process proceeds on to step 224 as described above, where the total amounts of fuel and electric power are calculated. Then the process proceeds on to step 226.

In step 226, the control portion 30 determines whether the selection of the vehicle 22 to be used has been made. This determination is made by determining whether a vehicle 22 to be used has been selected via the controller 28. This step is repeated until the determination is yes, at which time the process proceeds on to step 228.

In step 228, electric power is supplied from another vehicle 22 to the vehicle 22 that will be used. That is, the control portion 30 turns the main switch 48 in FIG. 4 off and turns the switches 46 that correspond to the vehicle 22 to be used and the other vehicle 22 on, and charges the vehicular secondary battery 24 of the vehicle 22 that will be used with the electric power from the vehicular secondary battery 24 of the other vehicle 22.

In this example embodiment, this kind of routine enables an appropriate amount of power to be supplied from the vehicle 22 to the building 12, according to the type of vehicle 22.

Continuing on, an electric power supply system according to a second example embodiment of the invention will now be described. In the first example embodiment, when supplying electric power from the vehicle 22 to the building 12, electric power is supplied to the building 12 after determining the electric power supply method according to the type of vehicle 22. However, in this second example embodiment, electric power is supplied to the building 12 after determining the electric power supply method according to the type of electric power stored in the vehicular secondary battery 24. The basic structure is similar to that in the first example embodiment, so like reference characters will be used to denote like structures, and detailed descriptions of those structures will be omitted.

Also, in this example embodiment, when supplying electric power from the vehicle 22 to the building 12, electric power is supplied after first determining the order of priority in which electric power is to be supplied by the time of day or night, the load of the electrical equipment 16, and the like.

Figure 7:
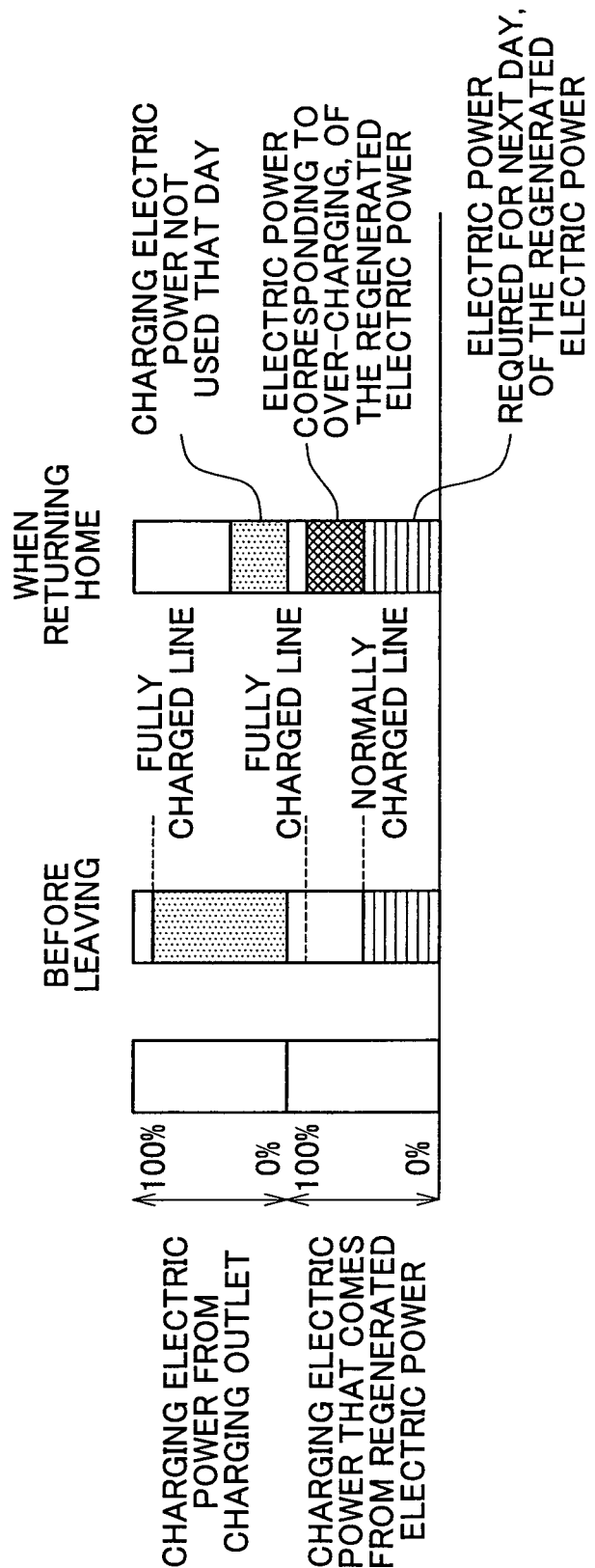
FIG. 7 is a graph of an example of the amount of electric power in a vehicular secondary battery when distinguishing between charging electric power from a charging outlet and charging electric power that comes from regenerated electric power.

Incidentally, as shown in FIG. 7, electric power to be charged to the vehicular secondary battery 24 may be divided into a) charging electric power from a charging outlet (i.e., the system power supply 20), and b) charging electric power that comes from regenerated electric power that is regenerated during deceleration or braking. Therefore, in this example embodiment, the supply of electric power is controlled according to the type of electric power, which can be distinguished by the charging source. That is, the supply of electric power to the building 12 is controlled distinguishing between charging electric power from a charging outlet and charging electric power that comes from regenerated electric power.

These types of electric power may be distinguished from one another by for example, distinguishing the type of secondary battery by providing both a secondary battery for the charging outlet and a secondary battery for regenerated electric power, separate from one another, or, when charging the vehicular secondary battery 24, by having the charge-discharge control portion 38 store (i.e., record) both the charging amount from the charging outlet and the charging amount with regenerated electric power and manage those amounts separately.

That is, in this example embodiment, the charge-discharge control portion 38 distinguishes the type of electric power by charging the secondary battery for the charging outlet or charging the vehicular secondary battery 24 while having the charge-discharge control portion 38 store (i.e., record) the charging amount from the charging outlet, as the charging electric power from the charging outlet, and charging the secondary battery for regenerated electric power or charging the vehicular secondary battery 24 while having the charge-discharge control portion 38 store (i.e., record) the charging amount with regenerated electric power, as the charging electric power that comes from regenerated electric power.

FIG. 7 is a graph of an example of the amount of electric power in the vehicular secondary battery 24 when distinguishing between charging electric power from a charging outlet and charging electric power that comes from regenerated electric power.

In FIG. 7, for both the charging electric power from the charging outlet and the charging electric power that comes from regenerated electric power, the fully charged line is set different from a charging amount (i.e., a state-of-charge) of 100% in order to prevent degradation due to over-charging. Incidentally, over-discharging and over-charging is dangerous so charging and discharging are normally repeated within a certain definite range (such as between 40% and 70%).

In this example embodiment, as described above, the order of priority in which electric power is to be supplied from the vehicle 22 to the building 12 is determined by the time of day or night, the load of the electrical equipment 16, and the like. This order of priority is determined by the control portion 30.

The control portion 30 supplies refresh discharging electric power, which is electric power that would otherwise be wasted, to the building 12 as the first priority. Incidentally, a characteristic of a secondary battery is that it will degrade if left fully charged for an extended period of time, so the secondary battery is discharged once and then charged again. The discharging at this time is referred to as "refresh discharging," and that electric power is referred to as "refresh discharging electric power." During refresh discharging, only some, not all, of the electric power is discharged.

Also, when returning home at an hour when daytime electricity rates and intermediate electricity rates (electricity costs more than it does late at night and more $CO_2$ is emitted than is emitted late at night) are charged, on a plan with three different rates depending on the time of day (i.e., a rate plan that has a daytime electricity rate; an intermediate electricity rate, and a nighttime electricity rate), the electric power of the vehicular secondary battery 24 in the vehicle 22 is charged again with nighttime electric power. Then the charging electric power that had not been used that day, of the charging power from the charging outlet, is supplied to the building 12 as the second priority.

Further, when supplying electric power for the smallest required load in the building 12 during a power outage, the control portion 30 supplies electric power necessary for the next day, of the electric power regenerated when decelerating or braking, to the building 12 as the third priority.

Also, if the building 12 still requires electric power even after all of the electric power of the third priority has been consumed, the control portion 30 starts the engine of the vehicle 22 to generate electric power which it then supplies to the building 12 as the fourth priority. In this case, when the vehicle 22 is connected to the building 12 by the cable 26, the control portion 30 is able to start the engine of the vehicle 22 in response to personal authentication or the like (a key is not required) with only a signal from the building 12 side.

With the electric power of each of the first to the fourth priorities described above, the control portion 30 calculates the amount of electric power by learning daily as well as monitors the loads in the building 12, and supplies the optimum amount of the optimum type of electric power from the vehicle 22.

In order to have the control portion 30 learn as described above, the charge-discharge control portion 38 stores the information described below. Incidentally, in this example embodiment, the information below is stored in the charge-discharge control portion 38, but it may also be stored in the control portion 30.

(1) The difference of the charging electric power from the charging outlet minus the electric power used during running is calculated and stored in order to calculate the charging electric power not used that day, of the charging electric power from the charging outlet.

(2) The difference of the regenerated electric power derived from the estimated running distance minus the electric power necessary for the next day is calculated and stored in order to calculate the amount of regenerated electric power that corresponds to overcharging.

(3) The electric power necessary for the next day, of the regenerated electric power, is calculated and stored.

(4) The product of the period after the battery is fully charged multiplied by a preset degradation coefficient is calculated and stored in order to calculate the refresh discharge electric power.

(5) The sum of the amount of generated electric power added to a preset amount of electric power required for the electrical equipment to be operated during a power outage, of the loads in the building 12, is stored in order to calculate the electric power to be generated by starting the engine. Incidentally, the generated electric power is basically controlled to the smallest amount required for environmental reasons, but if the power outage continues for an extended period of time, electric power may be generated at a level that enables the vehicular secondary battery 24 of the vehicle 22 to be charged after electric power is supplied to the electrical equipment 16 in the building 12 by changing the mode or the like using the controller 28.

Incidentally, the control portion 30 in this example embodiment may identify the state of the loads in the building 12, the time-of-day with respect to the electricity utility rates, and whether or not there is a power outage, and the like, and transmit that information to the vehicle side via communication. More specifically, the control portion 30 on the building 12 side identifies the state of the loads in the building 12, the time-of-day with respect to the electricity utility rates, and whether or not there is a power outage, and the like, transmits this information to the vehicle 22 side, and then the charge-discharge control portion 38 may determine whether to turn the supply of electric power on or off. Alternatively, the control portion 30 may not only identify the state of the loads in the building 12, the time-of-day with respect to the electricity utility rates, and whether or not there is a power outage, and the like, but also determine whether to turn the supply of electric power on or off. Also, in the latter case, information regarding the state of each type of electric power is transmitted from the vehicle 22 side, so a sensor for detecting each electric power on the vehicle 22 side is provided.

Figure 8:
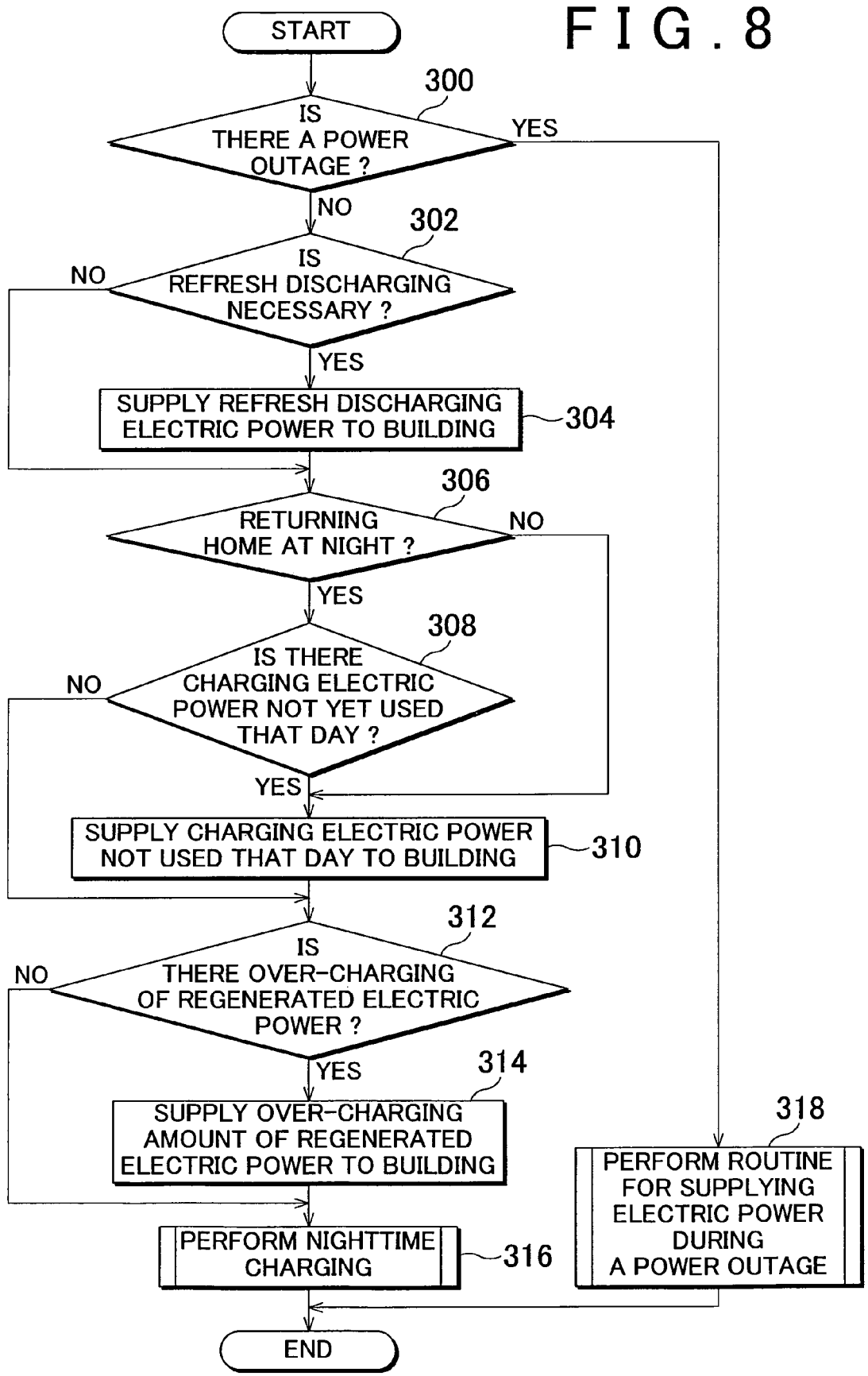
FIG. 8 is a flowchart illustrating an example of a routine when supplying electric power from a vehicle to a building, in an electric power supply system according to a second example embodiment of the invention.

Continuing on, a routine executed by the electric power supply system according to the second example embodiment of the invention structured as described above will now be described. FIG. 8 is a flowchart illustrating an example of a routine when supplying electric power from the vehicle 22 to the building 12, in an electric power supply system according to the second example embodiment of the invention.

First, in step 300, the control portion 30 determines whether there is a power outage. If the determination is no, the process proceeds on to step 302. If, on the other hand, the determination is yes; the process proceeds on to step 318 where a routine is performed to supply electric power during a power outage. This routine will be described later.

In step 302, the control portion 30 determines whether refresh discharging is necessary. This determination is made based on information stored in the charge-discharge control portion 38. That is, it is determined whether the product of the period from after battery is fully charged multiplied by a preset degradation coefficient is equal to or greater than a preset value, for example. If the determination is yes, the process proceeds on to step 304. If, on the other hand, the determination is no, the process proceeds on to step 306. Incidentally, the determination in this step may also be made by the charge-discharge control portion 38 on the vehicle 22 side.

In step 304, refresh discharging electric power of the vehicular secondary battery 24 is supplied to the building 12. That is, the charge-discharge control portion 38 refresh-discharges the vehicular secondary battery 24 and supplies the refresh discharging electric power to the building 12. After step 304, the process proceeds on to step 306.

In step 306, the control portion 30 determines whether the vehicle 22 is returning home at night. This determination is made by determining whether the cable 26 is connected at night, for example. If the determination is yes, the process proceeds on to step 308. If, on the other hand, the determination is no, then the process proceeds on to step 310.

In step 308, the control portion 30 determines whether there is charging electric power that has not yet been used that day. This determination is made based on information stored in the charge-discharge control portion 38. That is, the difference of the charging electric power from the charging outlet, minus the electric power used during running is calculated and it is determined whether that calculated electric power exists. If the determination is yes, the process proceeds on to step 310. If, on the other hand, the determination is no, the process proceeds on to step 312.

In step 310, the charging electric power that has not yet been used that day is supplied to the building 12. That is, the charge-discharge control portion 38 supplies charging electric power that has not yet been used that day, of the charging electric power in the vehicular secondary battery 24, to the building 12. For example, when both a secondary battery for the charging outlet and a secondary battery for regenerated electric power are provided, the electric power remaining in the secondary battery for the charging outlet is supplied to the building 12, and when the charging amount from the charging outlet and the charging amount with regenerated electric power are stored in the charge-discharge control portion 38, the amount of electric power remaining after the amount used has been subtracted from the charging amount from the charging outlet is supplied to the building 12. After step 310, the process proceeds on to step 312.

In step 312, the control portion 30 determines whether there is over-charging of regenerated electric power. This determination is made based on, information stored in the charge-discharge control portion 38. That is, the difference of the regenerated electric power derived from the estimated running distance minus the electric power necessary for the next day is calculated, and it is determined whether that calculated electric power exists. If the determination is yes, the process proceeds on to step 314. If, on the other hand, the determination is no, then the process proceeds on to step 316.

In step 314, the over-charging amount of the regenerated electric power is supplied to the building 12. That is, the charge-discharge control portion 38 supplies the over-charging amount of the regenerated electric power to the building 12. For example, when both a secondary battery for the charging outlet and a secondary battery for regenerated electric power are provided, the electric power that remains after the electric power necessary for the next day is subtracted from the charging electric power in the secondary battery for regenerated electric power is supplied to the building 12, and when the charging amount from the charging outlet and the charging amount with regenerated electric power are stored in the charge-discharge control portion 38, the electric power remaining after the electric power necessary for the next day has been subtracted from the charging amount with regenerated electric power is supplied to the building 12. After step 314, the process proceeds on to step 316.

In step 316, nighttime charging is performed, after which this cycle of the routine ends. Incidentally, nighttime charging refers to charging the vehicular secondary battery 24 at a predetermined time when the electricity rate is low.

Incidentally, in the description above, electric power is supplied from the vehicle 22 to the building 12 in the order of i) refresh discharging electric power, ii) charging electric power not used that day, and iii) electric power that corresponds to the over-charging amount, of regenerated electric power. However, if this electric power is supplied in that order and there is enough electric power for the building 12, this cycle of the routine may stop at this point or the remaining electric power may be charged to the household secondary battery 18.

Figure 9A:
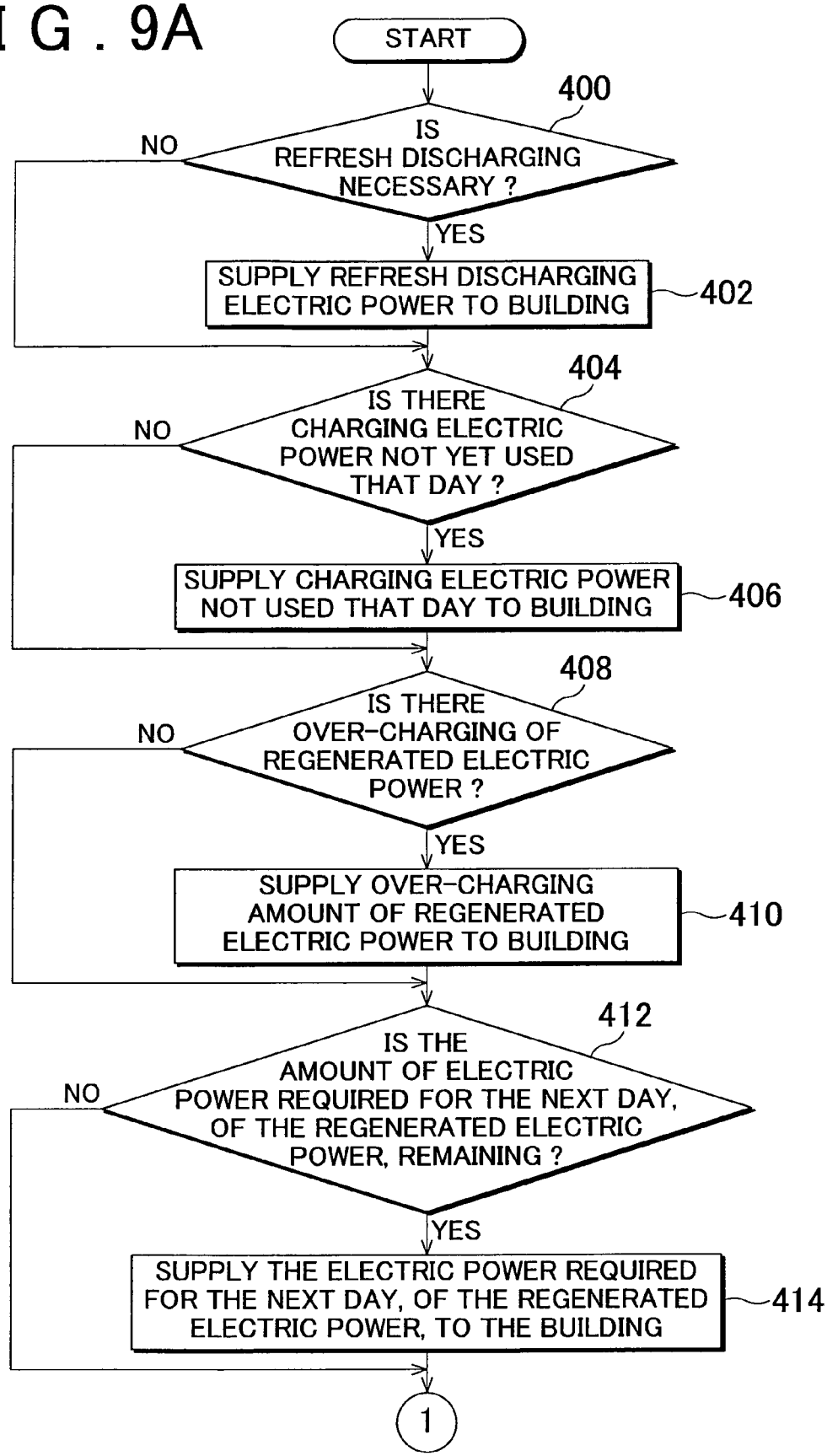
FIG. 9A and FIG. 9B are a flowchart illustrating an example of a routine for supplying electric power during a power outage in a routine that is performed when supplying electric power from a vehicle to a building, in an electric power supply system according to the second example embodiment of the invention.
Figure 9B:
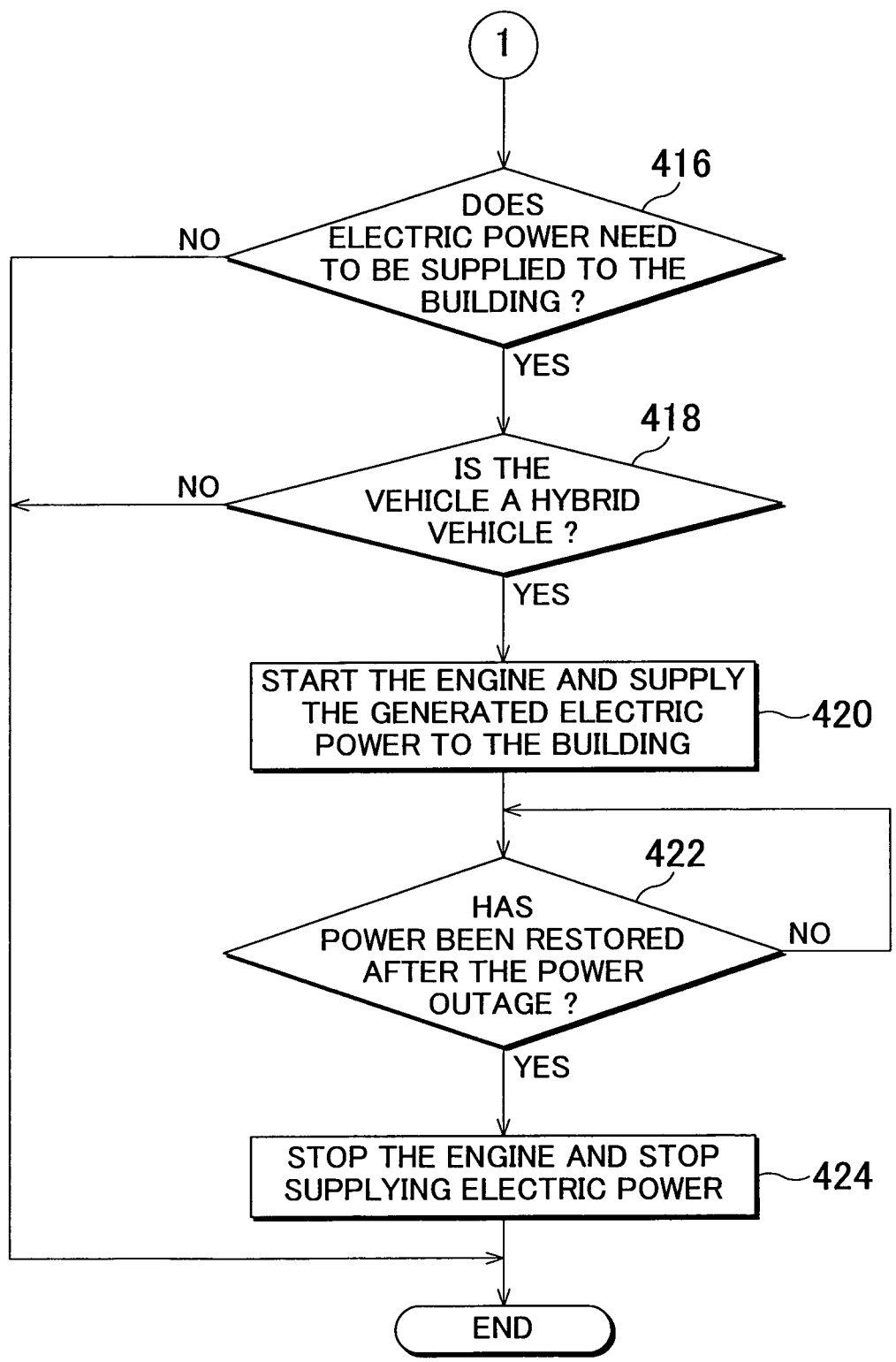

Next, the routine for supplying electric power during a power outage will be described. FIG. 9A and FIG. 9B are a flowchart illustrating an example of a routine for supplying electric power during a power outage in a routine that is performed when supplying electric power from the vehicle to the building, in the electric power supply system according to the second example embodiment of the invention.

In step 400, the control portion 30 determines whether refresh discharging is necessary. This determination is made based on information stored in the charge-discharge control portion 38. That is, it is determined whether the product of the period from after battery is fully charged multiplied by a preset degradation coefficient is equal to or greater than a preset value, for example. If the determination is yes, the process proceeds on to step 402. If, on the other hand, the determination is no, the process proceeds on to step 404. Incidentally, the determination in this step may also be made by the charge-discharge control portion 38 on the vehicle 22 side.

In step 402, refresh discharging electric power is supplied to the building 12. That is, the charge-discharge control portion 38 refresh-discharges the vehicular secondary battery 24 and supplies the refresh discharging electric power to the building 12. After step 402, the process proceeds on to step 404.

In step 404, the control portion 30 determines whether there is charging electric power that has not yet been used that day. This determination is made based on information stored in the charge-discharge control portion 38. That is, the difference of the charging electric power from the charging outlet minus the electric power used during running is calculated and it is determined whether that calculated electric power exists. If the determination is yes, the process proceeds on to step 406. If, on the other hand, the determination is no, the process proceeds on to step 408.

In step 406, the charging electric power that has not yet been used that day is supplied to the building 12. That is, the charge-discharge control portion 38 supplies charging electric power that has not yet been used that day, of the charging electric power in the vehicular secondary battery 24, to the building 12. For example, when both a secondary battery for the charging outlet and a secondary battery for regenerated electric power are provided, the electric power remaining in the secondary battery for the charging outlet is supplied to the building 12, and when the charging amount from the charging outlet and the charging amount with regenerated electric power are stored in the charge-discharge control portion 38, the electric power remaining after the amount used has been subtracted from the charging amount from the charging outlet is supplied to the building 12. After step 406, the process proceeds on to step 408.

In step 408, the control portion 30 determines whether there is over-charging of regenerated electric power. This determination is made based on information stored in the charge-discharge control portion 38. That is, the difference of the regenerated electric power derived from the estimated running distance minus the electric power necessary for the next day is calculated, and it is determined whether that calculated electric power exists. If the determination is yes, the process proceeds on to step 410. If, on the other hand, the determination is no, then the process proceeds on to step 412.

In step 410, the over-charging amount of the regenerated electric power is supplied to the building 12. That is, the charge-discharge control portion 38 supplies the over-charging amount of the regenerated electric power to the building 12. For example, when both a secondary battery for the charging outlet and a secondary battery for regenerated electric power are provided, the electric power that remains after the electric power necessary for the next day is subtracted from the charging electric power in the secondary battery for regenerated electric power is supplied to the building 12, and when the charging amount from the charging outlet and the charging amount with regenerated electric power are stored in the charge-discharge control portion 38, the electric power remaining after the electric power necessary for the next day has been subtracted from the charging amount with regenerated electric power is supplied to the building 12. After step 410, the process proceeds on to step 412.

In step 412, the control portion 30 determines whether the amount of electric power, of the regenerated electric power, that is required for the next day remains. That is, it is determined whether the electric power necessary for the next day, of the regenerated electric power, that is stored (i.e., recorded) in the charge-discharge control portion 38 exists. If the determination is yes, the process proceeds on to step 414. If the determination is no, the process proceeds on to step 416.

In step 414, the electric power necessary for the next day, of the regenerated electric power, is supplied to the building 12. That is, the charge-discharge control portion 38 also supplies the electric power necessary for the next day, of the regenerated electric power, to the building 12. After step 414, the process proceeds on to step 416.

In step 416, the control portion 30 determines whether it is necessary to supply electric power to the building 12. This determination is made based on the load in the building 12 and the amount of electric power remaining in the household secondary battery 18. If the determination is yes, the process proceeds on to step 418. If the determination is no, then this cycle of the routine ends.

In step 418, the control portion 30 determines whether the vehicle 22 that is connected is a hybrid vehicle. This determination is made by determining whether the vehicle 22 is a hybrid vehicle by the control apparatus 14 communicating with the vehicle 22. If the determination is yes, the process proceeds on to step 420. If, on the other hand, the determination is no, then no more electric power is able to be supplied from the vehicle 22, so this cycle of the routine ends.

In step 420, the engine of the vehicle 22 is started to generate electric power which is then supplied to the building 12. That is, the control portion 30 starts the engine of the vehicle 22 by communicating with the charge-discharge control portion 38 and outputting an engine stop command or like. Electric power is then generated by the alternator or the like, and the generated electric power is supplied to the building 12. After step 420, the process proceeds on to step 422.

In step 422, the control portion 30 determines whether power has been restored after a power outage. This step is repeated until the determination is yes, at which time the process proceeds on to step 424.

In step 424, the engine is stopped and the supply of electric power is stopped. That is, the control portion 30 stops the engine and the supply of generated electric power to the building 12 by outputting an engine stop command or the like to the charge-discharge control portion 38. After step 424, this cycle of the routine ends.

Figure 10A:
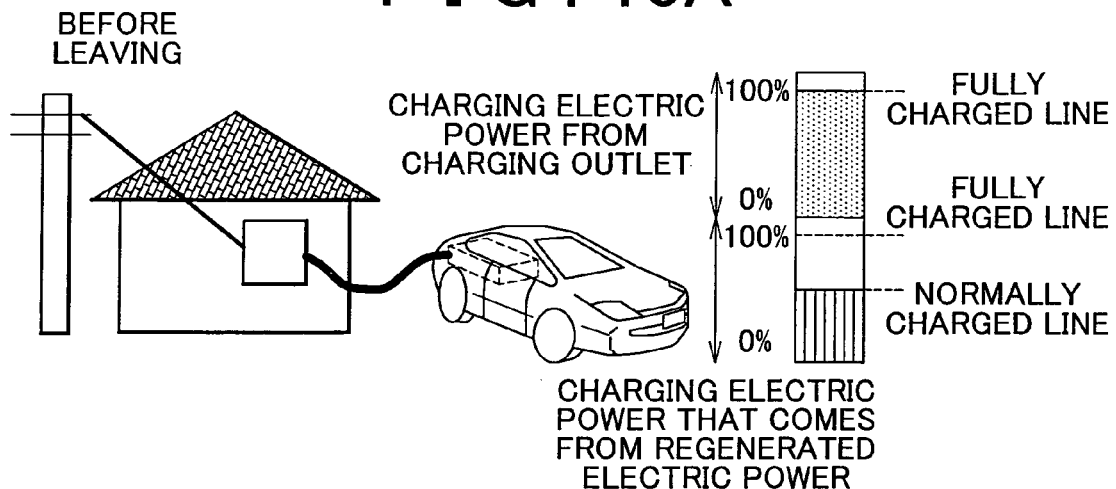
FIG. 10A is an example of the state-of-charge of a vehicular secondary battery before leaving.
Figure 10B:
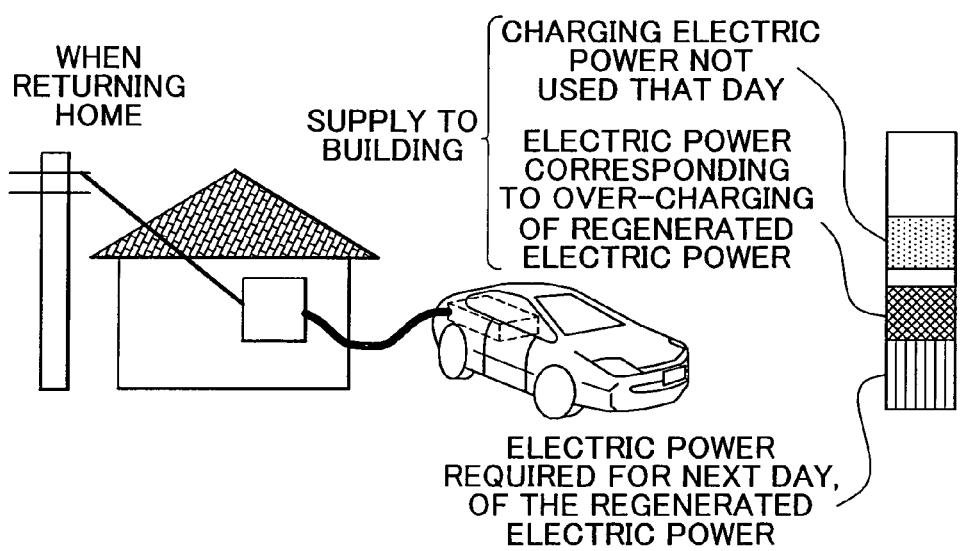
FIG. 10B is an example of the state-of-charge of the vehicular secondary battery after returning home.
Figure 10C:
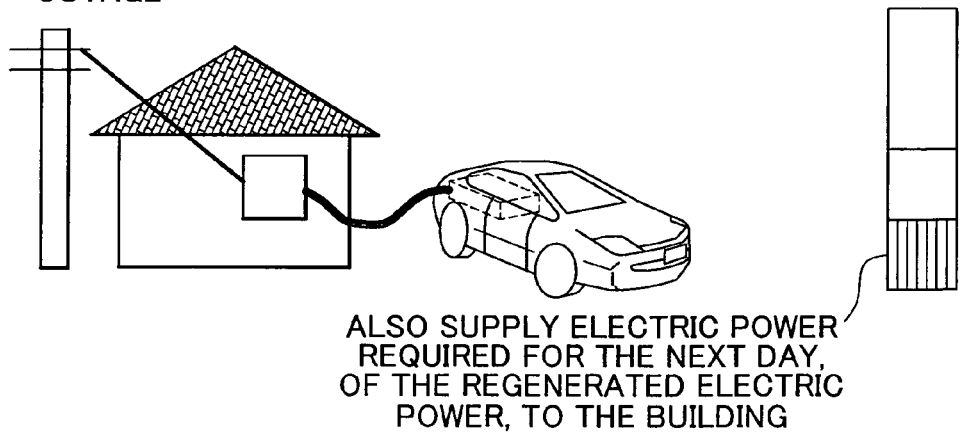
FIG. 10C is an example of the state-of-charge of the vehicular secondary battery during a power outage.

Here, a detailed example of the routine described above will be described. FIG. 10A is an example of the state-of-charge of a vehicular secondary battery before leaving. FIG. 10B is an example of the state-of-charge of the vehicular secondary battery after returning home, and FIG. 10C is an example of the state-of-charge of the vehicular secondary battery during a power outage.

For example, in this example embodiment, the vehicular secondary battery 24 is charged by supplying electric power to the vehicular secondary battery 24 from the system power supply 20 using nighttime electric power. As shown in FIG. 10A, charging electric power from the charging outlet is charged until the fully charged line is reached. Incidentally, FIG. 10A shows a case in which the charging electric power that comes from regenerated electric power is charged to the normally charged line as a result of running the day before.

Here, a case will be assumed in which there is both electric power that has not been used that day, of the charging electric power from the charging outlet, and electric power that corresponds to overcharging, of the charging electric power that comes from regenerated electric power, remaining when the vehicle 22 returns home in the state shown in FIG. 10A after being out.

At this time, first, when refresh discharging is necessary, refresh discharging is performed and the electric power discharged from the vehicular secondary battery 24 is supplied to the building 12.

Also, all of the electric power that had not been used that day, of the charging electric power from the charging outlet of the vehicular secondary battery 24, is supplied to the building 12.

Next, the amount of charging electric power that comes from the regenerated electric power, which corresponds to over-charging, less the electric power that is necessary for the next day, is supplied to the building 12.

Also, when there is a power outage, there will be a shortage of electric power, excluding the electric power described above, so the electric power, that is necessary for the next day, of the charging electric power that comes from the regenerated electric power, is also supplied to the building 12.

Also, if there is, a further shortage of electric power, electric power is generated by starting, the engine of the vehicle 22, and the generated electric power is supplied to the building 12.

Supplying electric power from the vehicle 22 to the building 12 in this way enables the appropriate electric power to be supplied from the vehicle 22 to the building 12.

Incidentally, in the first and second example embodiments, after the vehicle 22 has finished being used each day, the electric power remaining in the vehicular secondary battery 24 may also be supplied to the building 12 during daytime electric utility hours or intermediate electric utility hours, which are the hours between daytime and nighttime. That is, when information indicating that the vehicle 22 has finished being used for the day is entered into the controller 28, the control portion 30 may also perform control to supply all of the electric power remaining in the vehicular secondary battery 24 to the building 12 when the vehicle 22 is connected to the control apparatus 14 by the cable 26 during daytime electric utility hours or intermediate electric utility hours.

The invention claimed is:

1. An electric power supply system comprising:
a connecting device that connects a secondary battery provided in a vehicle to a building; and
a control apparatus that i) identifies the type of the vehicle that is connected to the connecting device, the type of the secondary battery, or the type of electric power that is distinguishable by the charging source of the electric power stored in the secondary battery, ii) determines a preset electric power supply method based on the identification results, and iii) controls a supply of electric power from the secondary battery to the building based on the determined electric power supply method; wherein
the control apparatus identifies the type of the secondary battery or the type of the electric power stored in the secondary battery by obtaining information indicative of the type of the secondary battery or the type of electric power stored in the secondary battery from the vehicle connected to the connecting device; and
the control apparatus determines the order of priority in which i) electric power charged from a household power supply of the building, of the charging electric power in the secondary battery, and ii) electric power charged from regenerated electric power that is regenerated while the vehicle is running, are to be supplied to the building, and controls the supply of electric power according to that determined order of priority.

2. The electric power supply system according to claim 1, wherein the control apparatus controls the supply of electric power such that all of the electric power in the secondary battery is supplied to the building when the type of the vehicle is identified as a hybrid vehicle.

3. The electric power supply system according to claim 1, wherein the control apparatus controls the supply of electric power such that a portion of all of the electric power charged to the secondary battery is supplied to the building when the type of the vehicle is identified as a hybrid vehicle and the amount of fuel remaining in the vehicle is less than a predetermined amount.

4. The electric power supply system according to claim 1, wherein the control apparatus i) obtains information indicative of the type of the vehicle, the amount of fuel remaining in the vehicle, and a charging amount of the secondary battery, ii) determines the amount of electric power to supply based on the obtained information, and iii) controls the supply of electric power such that the determined amount of electric power to supply is supplied to the building.

5. The electric power supply system according to claim 1, wherein the type of electric power stored in the secondary battery includes i) electric power charged from the household power supply of the building, and ii) electric power charged from regenerated electric power that is regenerated while the vehicle is running.

6. The electric power supply system according to claim 1, wherein the control apparatus controls the supply of electric power such that electric power that remains after electric power required for running the vehicle is subtracted from the electric power charged from the regenerated electric power, is preferentially supplied.

7. The electric power supply system according to claim 6, wherein the control apparatus controls the supply of electric power such that refresh discharging electric power of the secondary battery is supplied as a first priority.

8. The electric power supply system according to claim 1, further comprising:
an input device that is provided in the building for inputting information relating to the vehicle,
wherein the control apparatus controls the supply of electric power based on the information input into the input device.

9. The electric power supply system according to claim 1, wherein after the vehicle has finished being used each day, the control apparatus controls the supply of electric power such that electric power remaining in the secondary battery is supplied to the building during daytime electric utility hours or intermediate electric utility hours.

10. The electric power supply system according to claim 9, wherein the intermediate electric utility hours are hours between the daytime and nighttime.

11. The electric power supply system according to claim 6, wherein the control apparatus controls the supply of electric power such that the electric power required for running the vehicle is also supplied when there is a power outage in the building.

12. The electric power supply system according to claim 11, wherein when the electric power required for running the vehicle has been consumed, the control apparatus starts an engine of the vehicle to generate electric power, and controls the supply of electric power such that the generated electric power is supplied.

13. An electric power supply method of an electric power supply system provided with a connecting device that connects a secondary battery provided in a vehicle to a building, comprising:

identifying the type of the vehicle that is connected to the connecting device, the type of the secondary battery, or the type of electric power that is distinguishable by the charging source of the electric power stored in the secondary battery;

determining a preset electric power supply method based on the identification results;

controlling a supply of electric power from the secondary battery to the building based on the determined electric power supply method;

identifying the type of the secondary battery or the type of the electric power stored in the secondary battery by obtaining information indicative of the type of the secondary battery or the type of electric power stored in the secondary battery from the vehicle connected to the connecting device; and determining the order of priority in which i) electric power charged from a household power supply of the building, of the charging electric power in the secondary battery, and ii) electric power charged from regenerated electric power that is regenerated while the vehicle is running, are to be supplied to the building, and controls the supply of electric power according to that determined order of priority.

* * * * *